(12) United States Patent
Yoon

(10) Patent No.: US 10,587,740 B2
(45) Date of Patent: Mar. 10, 2020

(54) MOBILE DEVICE AND METHOD FOR CONTROLLING SAME

(71) Applicant: LG ELECTRONICS INC., Seoul (KR)

(72) Inventor: Hyounghwa Yoon, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/741,485

(22) PCT Filed: Aug. 25, 2015

(86) PCT No.: PCT/KR2015/008862
§ 371 (c)(1),
(2) Date: Jan. 2, 2018

(87) PCT Pub. No.: WO2017/003017
PCT Pub. Date: Jan. 5, 2017

(65) Prior Publication Data
US 2018/0367655 A1    Dec. 20, 2018

(30) Foreign Application Priority Data
Jul. 2, 2015    (KR) .......................... 10-2015-0094749

(51) Int. Cl.
*H04W 4/00*    (2018.01)
*H04M 1/2745*    (2020.01)
(Continued)

(52) U.S. Cl.
CPC ...... *H04M 1/274583* (2013.01); *G06F 3/023* (2013.01); *G06F 3/0237* (2013.01);
(Continued)

(58) Field of Classification Search
CPC ....... H04W 4/12; H04W 4/14; H04W 88/184; H04M 1/72519; H04M 1/72522; H04M 1/72583
(Continued)

(56) References Cited

U.S. PATENT DOCUMENTS

| 10,063,497 B2* | 8/2018 | Snider ..................... H04L 51/02 |
| 2007/0067398 A1* | 3/2007 | Karmarkar .............. H04L 51/38 |
| | | 709/206 |

(Continued)

FOREIGN PATENT DOCUMENTS

| JP | 2005285060 | 10/2005 |
| KR | 1020060008395 | 1/2006 |

(Continued)

OTHER PUBLICATIONS

PCT International Application No. PCT/KR2015/008862, Written Opinion of the International Searching Authority dated Mar. 28, 2016, 22 pages.

*Primary Examiner* — Temica M Beamer
(74) *Attorney, Agent, or Firm* — Lee, Hong, Degerman, Kang & Waimey

(57) ABSTRACT

The present specification relates to a mobile device and a method for controlling the same. The present invention receives a first text from a memory or a first external device; obtains, from the memory, at least one receiver information including at least one from among the receiver's phone number and the receiver's email address; determines priority on the basis of the obtained receiver information; generates a second text on the basis of the determined priority and the received first text; displays the generated second text to a second external device which corresponds to the receiver information and is different from the first external device.

20 Claims, 21 Drawing Sheets

(51) Int. Cl.
    *G06F 3/023*       (2006.01)
    *H04W 4/14*        (2009.01)
    *H04W 4/02*        (2018.01)
    *H04M 1/725*       (2006.01)
    *H04W 4/06*        (2009.01)
    *H04W 4/80*        (2018.01)
    *H04W 4/12*        (2009.01)

(52) U.S. Cl.
    CPC ....... *H04M 1/72552* (2013.01); *H04W 4/023* (2013.01); *H04W 4/14* (2013.01); *H04M 2250/22* (2013.01); *H04W 4/027* (2013.01); *H04W 4/06* (2013.01); *H04W 4/12* (2013.01); *H04W 4/80* (2018.02)

(58) Field of Classification Search
    USPC ................................................ 455/466, 566
    See application file for complete search history.

(56) References Cited

U.S. PATENT DOCUMENTS

2012/0077526 A1* 3/2012 Riffe ................. H04W 4/50
                                                       455/466
2015/0100901 A1* 4/2015 Yamanaka ............ G06F 3/0481
                                                       715/761

FOREIGN PATENT DOCUMENTS

| KR | 1020120007168 | 1/2012 |
| KR | 1020120129349 | 11/2012 |
| KR | 1020150017615 | 2/2015 |

* cited by examiner

FIG. 11
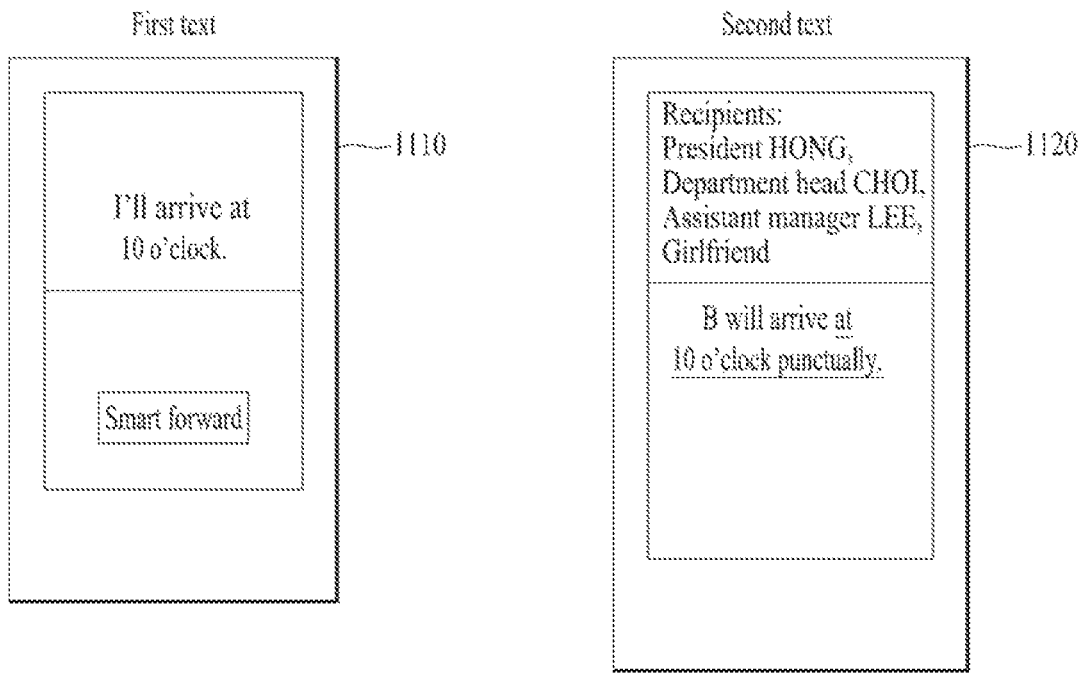
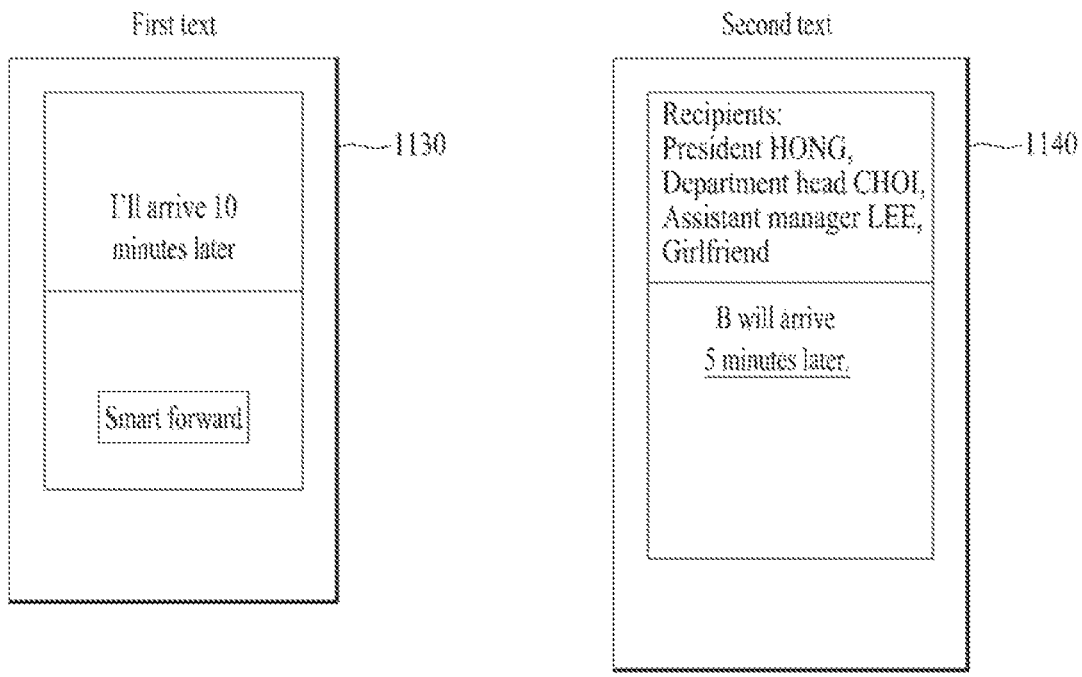

MOBILE DEVICE AND METHOD FOR CONTROLLING SAME

CROSS-REFERENCE TO RELATED APPLICATIONS

This application is the National Stage filing under 35 U.S.C. 371 of International Application No. PCT/KR2015/008862, filed on Aug. 25, 2015, which claims the benefit of earlier filing date and right of priority to Korean Application No. 10-2015-0094749, filed on Jul. 2, 2015, the contents of which are all hereby incorporated by reference herein in their entirety.

TECHNICAL FIELD

The present invention relates to a mobile device and method for controlling the same, and more particularly, to a mobile device and method for controlling the same, suitable for delivering a message by modifying a message expression appropriately to match a situation and the relationship between subordinates and superiors.

BACKGROUND ART

Owing to the recent development of IT technology, a wearable device is a rising big issue in everyday life. Particularly, a function of sending a text message in a mobile device or a wearable device is one of major functions.

The main idea of a related art system and method for managing an electronic message (United States Patent Application No. 20110119258 A1) includes receiving an electronic message for a client, accessing database of preference configuration for the client, accessing database for obtaining resending information of the received electronic message, using the obtained information to calculate an importance value and a factor value for a message, and re-sorting a client's electronic message before sending.

However, when a message received by a user is forwarded to a third party in a mobile or wearable device environment of the related art, since a used word and expression may vary depending on an ambient situation and relationship with the third part, the user should write a new message in consideration of such situation and relationship, thereby causing a problem of inconvenience to the user.

DISCLOSURE OF THE INVENTION

Technical Task

One technical task of the present invention is to provide a mobile device and method for controlling the same, by which when a user forwards a received message to a third party, a different text is generated in a manner of changing a word appropriately in consideration of priorities including positions between the user and the third party and usual conversation patterns.

Another technical task of the present invention is to provide a mobile device and method for controlling the same, by which when a user forwards a received message to a plurality of recipients, a different text is generated per recipient in a manner of changing a word appropriately in consideration of priorities including positions between the user and a plurality of the recipients and usual conversation patterns.

Further technical task of the present invention is to provide a mobile device and method for controlling the same, by which when a user forwards a received message to a third party, a text displaying a modified part differently from an original text is generated, thereby enabling the user to recognize the modified part intuitively and modify it easily.

Another further technical task of the present invention is to provide a mobile device and method for controlling the same, by which when a user forwards a response message to a received message to a sender, if a simple specific input is received from the user, a text including appropriate sentences are generated in consideration of priorities including positions between the user and the sender and usual conversation patterns.

Technical Solutions

In one technical aspect of the present invention, provided herein is a mobile device, including a communication module transceiving data with a first external device and a second external device, a memory storing at least one recipient information including at least one of a recipient phone number and a recipient email address, a controller configured to receive a first text through the communication module from the memory or the first external device, obtain recipient information from the memory, determine a priority based on the obtained recipient information, generate a second text based on the determined priority and the received first text, display the generated second text on a screen, and send the displayed second text to the second external device different from the first external device corresponding to the recipient information, and a display module displaying a text in response to a control command from the controller.

In another technical aspect of the present invention, provided herein is a method of controlling a mobile device, including receiving a first text from a memory or a first external device, obtaining at least one recipient information including at least one of a recipient phone number and a recipient email address from the memory, determining a priority based on the obtained recipient information, generating a second text based on the determined priority and the received first text, displaying the generated second text on a screen, and sending the displayed second text to a second external device different from the first external device corresponding to the recipient information.

Advantageous Effects

According to one embodiment of the present invention, when a user forwards a received message to a third party, a different text is generated in a manner of changing a word appropriately in consideration of priorities including positions between the user and the third party and usual conversation patterns, whereby user convenience is improved.

According to another embodiment of the present invention, when a user forwards a received message to a plurality of recipients, a different text is generated per recipient in a manner of changing a word appropriately in consideration of priorities including positions between the user and a plurality of the recipients and usual conversation patterns, whereby user convenience is improved.

According to further embodiment of the present invention, when a user forwards a received message to a third party, a text displaying a modified part differently from an original text is generated so as to enable the user to recognize the modified part intuitively and modify it easily, whereby user convenience is improved.

According to another further embodiment of the present invention, when a user forwards a response message to a received message to a sender, if a simple specific input is received from the user, a text including appropriate sentences are generated in consideration of priorities including positions between the user and the sender and usual conversation patterns, whereby user convenience is improved.

DESCRIPTION OF DRAWINGS

FIG. 11 is a diagram showing that a second text is generated by reflecting time information according to one embodiment of the present invention.

BEST MODE FOR INVENTION

Description will now be given in detail according to exemplary embodiments disclosed herein, with reference to the accompanying drawings. For the sake of brief description with reference to the drawings, the same or equivalent components may be provided with the same reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function.

In the present disclosure, that which is well-known to one of ordinary skill in the relevant art has generally been omitted for the sake of brevity.

The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

Although the terms first, second, etc. may be used herein to describe various elements, these elements should not be limited by these terms. These terms are generally only used to distinguish one element from another.

When an element is referred to as being "connected with" another element, the element can be connected with the other element or intervening elements may also be present. In contrast, when an element is referred to as being "directly connected with" another element, there are no intervening elements present.

A singular representation may include a plural representation unless it represents a definitely different meaning from the context.

Terms such as "include" or "has" are used herein and should be understood that they are intended to indicate an existence of several components, functions or steps, disclosed in the specification, and it is also understood that greater or fewer components, functions, or steps may likewise be utilized.

Mobile terminals presented herein may be implemented using a variety of different types of terminals. Examples of such terminals include cellular phones, smart phones, user equipment, laptop computers, digital broadcast terminals, personal digital assistants (PDAs), portable multimedia players (PMPs), navigators, portable computers (PCs), slate PCs, tablet PCs, ultra books, wearable devices (for example, smart watches, smart glasses, head mounted displays (HMDs)), and the like.

By way of non-limiting example only, further description will be made with reference to particular types of mobile terminals. However, such teachings apply equally to other types of terminals, such as those types noted above. In addition, these teachings may also be applied to stationary terminals such as digital TV, desktop computers, and the like.

Figure 1A:
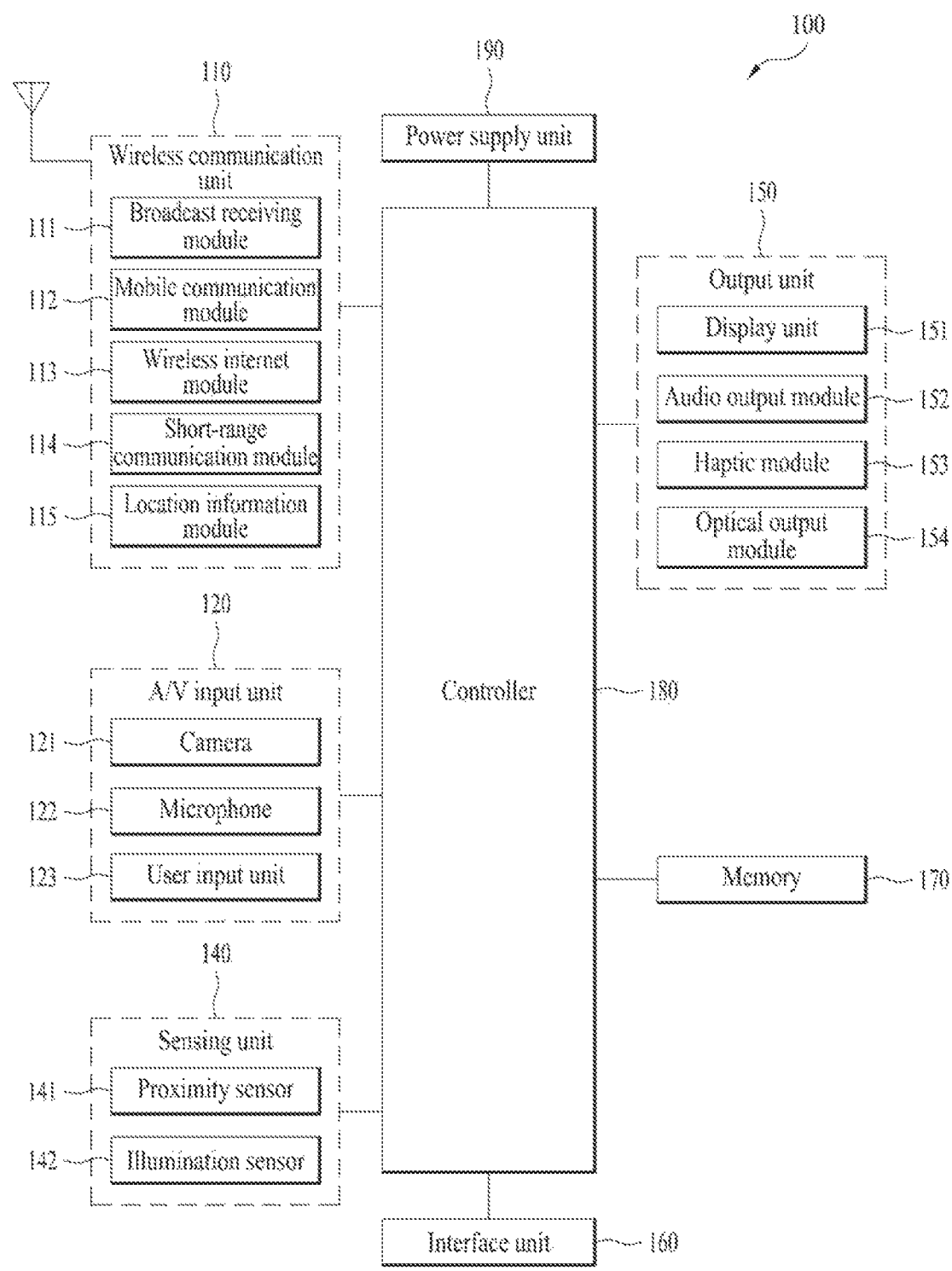
FIG. 1A is a block diagram to describe a mobile terminal related to the present disclosure.
Figure 1B:
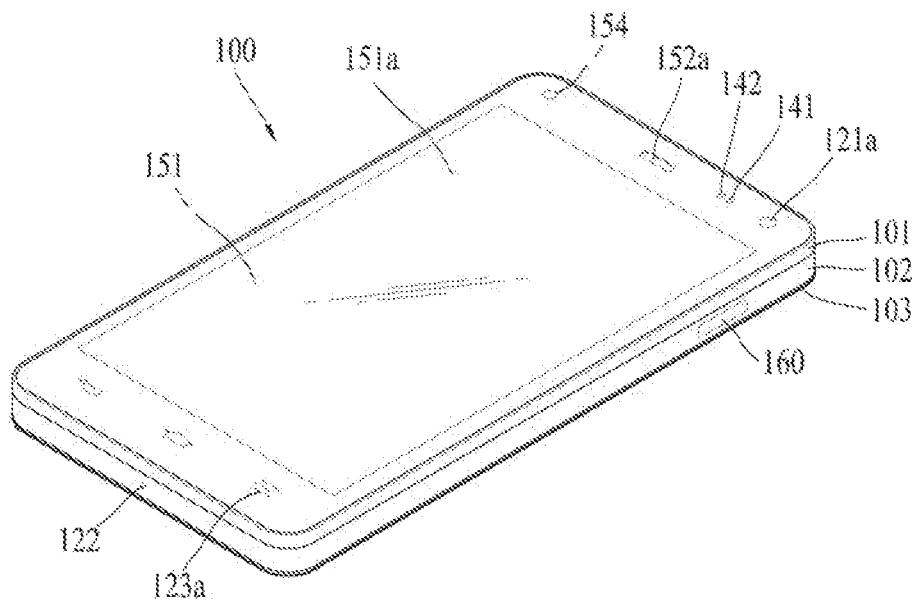
FIGS. 1B and 1C are conceptual diagrams for one example of the mobile terminal related to the present invention, viewed from different directions.
Figure 1C:
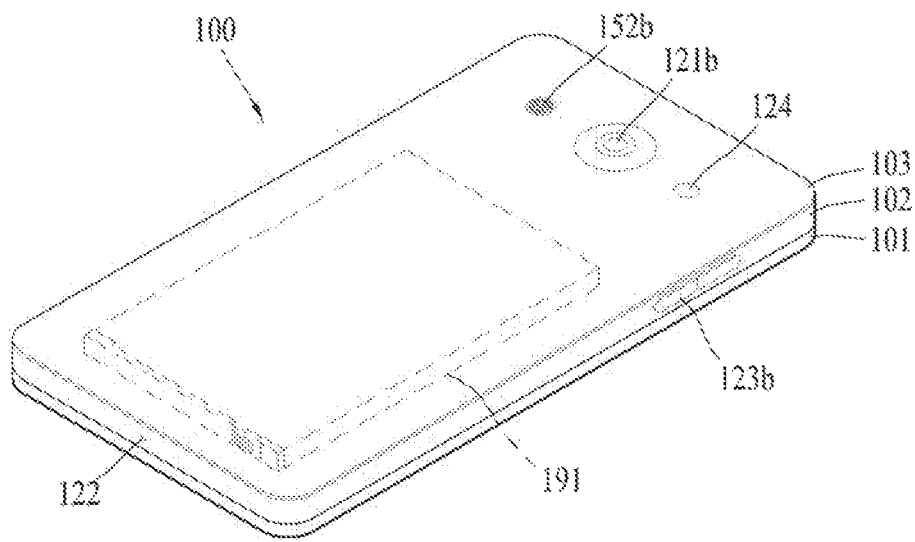

Reference is now made to FIGS. 1A-1C, where FIG. 1A is a block diagram of a mobile terminal in accordance with the present disclosure, and FIGS. 1B and 1C are conceptual views of one example of the mobile terminal, viewed from different directions.

The mobile terminal 100 is shown having components such as a wireless communication unit 110, an input unit 120, a sensing unit 140, an output unit 150, an interface unit 160, a memory 170, a controller 180, and a power supply unit 190. Implementing all of the illustrated components is not a requirement, and that greater or fewer components may alternatively be implemented. Referring now to FIG. 1A, the mobile terminal 100 is shown having wireless communication unit 110 configured with several commonly implemented components.

The wireless communication unit 110 typically includes one or more modules which permit communications such as wireless communications between the mobile terminal 100 and a wireless communication system, communications between the mobile terminal 100 and another mobile terminal, communications between the mobile terminal 100 and an external server. Further, the wireless communication unit 110 typically includes one or more modules which connect the mobile terminal 100 to one or more networks.

To facilitate such communications, the wireless communication unit 110 includes one or more of a broadcast receiving module 111, a mobile communication module 112, a wireless Internet module 113, a short-range communication module 114, and a location information module 115.

The input unit 120 includes a camera 121 for obtaining images or video, a microphone 122, which is one type of audio input device for inputting an audio signal, and a user input unit 123 (for example, a touch key, a push key, a mechanical key, a soft key, and the like) for allowing a user to input information. Data (for example, audio, video, image, and the like) is obtained by the input unit 120 and may be analyzed and processed by controller 180 according to device parameters, user commands, and combinations thereof.

The sensing unit 140 is typically implemented using one or more sensors configured to sense internal information of the mobile terminal, the surrounding environment of the mobile terminal, user information, and the like. For example, in FIG. 1A, the sensing unit 140 is shown having a proximity sensor 141 and an illumination sensor 142. If desired, the sensing unit 140 may alternatively or additionally include other types of sensors or devices, such as a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like), to name a few. The mobile terminal 100 may be configured to utilize information obtained from sensing unit 140, and in particular, information obtained from one or more sensors of the sensing unit 140, and combinations thereof.

The output unit 150 is typically configured to output various types of information, such as audio, video, tactile output, and the like. The output unit 150 is shown having a display unit 151, an audio output module 152, a haptic module 153, and an optical output module 154. The display unit 151 may have an inter-layered structure or an integrated structure with a touch sensor in order to facilitate a touch screen. The touch screen may provide an output interface between the mobile terminal 100 and a user, as well as function as the user input unit 123 which provides an input interface between the mobile terminal 100 and the user.

The interface unit 160 serves as an interface with various types of external devices that can be coupled to the mobile terminal 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 100 may perform assorted control functions associated with a connected external device, in response to the external device being connected to the interface unit 160.

The memory 170 is typically implemented to store data to support various functions or features of the mobile terminal 100. For instance, the memory 170 may be configured to store application programs executed in the mobile terminal 100, data or instructions for operations of the mobile terminal 100, and the like. Some of these application programs may be downloaded from an external server via wireless communication. Other application programs may be installed within the mobile terminal 100 at time of manufacturing or shipping, which is typically the case for basic functions of the mobile terminal 100 (for example, receiving a call, placing a call, receiving a message, sending a message, and the like). It is common for application programs to be stored in the memory 170, installed in the mobile terminal 100, and executed by the controller 180 to perform an operation (or function) for the mobile terminal 100.

The controller 180 typically functions to control overall operation of the mobile terminal 100, in addition to the operations associated with the application programs. The controller 180 processes signals, data, information and the like input or output through the above-mentioned components and/or runs application programs saved in the memory 170, thereby processing or providing a user with appropriate information and/or functions.

The controller 180 can provide or process information or functions appropriate for a user by processing signals, data, information and the like, which are input or output by the various components depicted in FIG. 1A, or activating application programs stored in the memory 170. As one example, the controller 180 controls some or all of the components illustrated in FIG. 1A according to the execution of an application program that have been stored in the memory 170.

The power supply unit 190 can be configured to receive external power or provide internal power in order to supply appropriate power required for operating elements and components included in the mobile terminal 100. The power supply unit 190 may include a battery, and the battery may be configured to be embedded in the terminal body, or configured to be detachable from the terminal body.

At least one portion of the respective components mentioned in the foregoing description can cooperatively operate to embody operations, controls or controlling methods of the mobile terminal according to various embodiments of the present invention mentioned in the following description. Moreover, the operations, controls or controlling methods of the mobile terminal can be embodied in the mobile terminal by running at least one or more application programs saved in the memory 170.

Referring still to FIG. 1A, various components depicted in this figure will now be described in more detail.

Regarding the wireless communication unit 110, the broadcast receiving module 111 is typically configured to receive a broadcast signal and/or broadcast associated information from an external broadcast managing entity via a broadcast channel. The broadcast channel may include a satellite channel, a terrestrial channel, or both.

The broadcast server means that can generate broadcast signal and broadcast information and transmit generated broadcast signal and broadcast information to the terminal.

In some embodiments, two or more broadcast receiving modules 111 may be utilized to facilitate simultaneously receiving of two or more broadcast channels, or to support switching among broadcast channels.

The broadcast information indicates that broadcast channel, broadcast program and the information related to the broadcast service provider.

The broadcast information can exist as various type. For example, EPG (Electronic Program Guide) of DMB (Digital Multimedia Broadcasting), ESG (Electronic Service Guide) of DVB-H (Digital Video Broadcast-Handheld).

The mobile communication module 112 can transmit and/or receive wireless signals to and from one or more network entities. Typical examples of a network entity include a base station, an external mobile terminal, a server, and the like. Such network entities form part of a mobile communication network, which is constructed according to technical standards or communication methods for mobile communications (for example, Global System for Mobile Communication (GSM), Code Division Multi Access (CDMA), CDMA2000 (Code Division Multi Access 2000), EV-DO (Enhanced Voice-Data Optimized or Enhanced Voice-Data Only), Wideband CDMA (WCDMA), High Speed Downlink Packet access (HSDPA), HSUPA (High Speed Uplink Packet Access), Long Term Evolution (LTE), LTE-A (Long Term Evolution-Advanced), and the like).

Examples of wireless signals transmitted and/or received via the mobile communication module 112 include audio call signals, video (telephony) call signals, or various formats of data to support communication of text and multimedia messages.

The wireless Internet module 113 is configured to facilitate wireless Internet access. This module may be internally or externally coupled to the mobile terminal 100. The wireless Internet module 113 may transmit and/or receive wireless signals via communication networks according to wireless Internet technologies.

Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), HSUPA (High Speed Uplink Packet Access), Long Term Evolution (LTE), LTE-A (Long Term Evolution-Advanced), and the like. The wireless Internet module 113 may transmit/receive data according to one or more of such wireless Internet technologies, and other Internet technologies as well.

In some embodiments, when the wireless Internet access is implemented according to, for example, WiBro, HSDPA, HSUPA, GSM, CDMA, WCDMA, LTE, LTE-A and the like, as part of a mobile communication network, the wireless Internet module 113 performs such wireless Internet access. As such, the Internet module 113 may cooperate with, or function as, the mobile communication module 112.

The short-range communication module 114 is configured to facilitate short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like. The short-range communication module 114 in general supports wireless communications between the mobile terminal 100 and a wireless communication system, communications between the mobile terminal 100 and another mobile terminal 100, or communications between the mobile terminal and a network where another mobile terminal 100 (or an external server) is located, via wireless area networks. One example of the wireless area networks is a wireless personal area networks.

In some embodiments, another mobile terminal (which may be configured similarly to mobile terminal 100) may be a wearable device, for example, a smart watch, a smart glass or a head mounted display (HMD), which can exchange data with the mobile terminal 100 (or otherwise cooperate with the mobile terminal 100). The short-range communication module 114 may sense or recognize the wearable device, and permit communication between the wearable device and the mobile terminal 100. In addition, when the sensed wearable device is a device which is authenticated to communicate with the mobile terminal 100, the controller 180, for example, may cause transmission of data processed in the mobile terminal 100 to the wearable device via the short-range communication module 114. Hence, a user of the wearable device may use the data processed in the mobile terminal 100 on the wearable device. For example, when a call is received in the mobile terminal 100, the user may answer the call using the wearable device. Also, when a message is received in the mobile terminal 100, the user can check the received message using the wearable device.

The location information module 115 is generally configured to detect, calculate, derive or otherwise identify a position of the mobile terminal. As an example, the location information module 115 includes a Global Position System (GPS) module, a Wi-Fi module, or both. If desired, the location information module 115 may alternatively or additionally function with any of the other modules of the wireless communication unit 110 to obtain data related to the position of the mobile terminal. As one example, when the mobile terminal uses a GPS module, a position of the mobile terminal may be acquired using a signal sent from a GPS satellite. As another example, when the mobile terminal uses the Wi-Fi module, a position of the mobile terminal can be acquired based on information related to a wireless access point (AP) which transmits or receives a wireless signal to or from the Wi-Fi module.

The input unit 120 may be configured to permit various types of input to the mobile terminal 120. Examples of such input include audio, image, video, data, and user input.

Image and video input is often obtained using one or more cameras 121. Such cameras 121 may process image frames of still pictures or video obtained by image sensors in a video or image capture mode. The processed image frames can be displayed on the display unit 151 or stored in memory 170. In some cases, the cameras 121 may be arranged in a matrix configuration to permit a plurality of images having various angles or focal points to be input to the mobile terminal 100. As another example, the cameras 121 may be located in a stereoscopic arrangement to acquire left and right images for implementing a stereoscopic image.

The microphone 122 is generally implemented to permit audio input to the mobile terminal 100. The audio input can be processed in various manners according to a function being executed in the mobile terminal 100. If desired, the microphone 122 may include assorted noise removing algorithms to remove unwanted noise generated in the course of receiving the external audio.

The user input unit 123 is a component that permits input by a user. Such user input may enable the controller 180 to control operation of the mobile terminal 100. The user input unit 123 may include one or more of a mechanical input element (for example, a key, a button located on a front and/or rear surface or a side surface of the mobile terminal 100, a dome switch, a jog wheel, a jog switch, and the like), or a touch-sensitive input, among others. As one example, the touch-sensitive input may be a virtual key or a soft key, which is displayed on a touch screen through software processing, or a touch key which is located on the mobile terminal at a location that is other than the touch screen. Further, the virtual key or the visual key may be displayed on the touch screen in various shapes, for example, graphic, text, icon, video, or a combination thereof.

The sensing unit 140 is generally configured to sense one or more of internal information of the mobile terminal, surrounding environment information of the mobile terminal, user information, or the like. The controller 180 generally cooperates with the sending unit 140 to control operation of the mobile terminal 100 or execute data processing, a function or an operation associated with an application program installed in the mobile terminal based on the sensing provided by the sensing unit 140. The sensing unit 140 may be implemented using any of a variety of sensors, some of which will now be described in more detail.

The proximity sensor 141 may include a sensor to sense presence or absence of an object approaching a surface, or an object located near a surface, by using an electromagnetic field, infrared rays, or the like without a mechanical contact. The proximity sensor 141 may be arranged at an inner region of the mobile terminal covered by the touch screen, or near the touch screen.

The proximity sensor 141, for example, may include any of a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and the like. When the touch screen is implemented as a capacitance type, the proximity sensor 141 can sense proximity of a pointer relative to the touch screen by changes of an electromagnetic field, which is responsive to an approach of an object with conductivity. In this instance, the touch screen (touch sensor) may also be categorized as a proximity sensor.

The term "proximity touch" will often be referred to herein to denote the scenario in which a pointer is positioned to be proximate to the touch screen without contacting the touch screen. The term "contact touch" will often be referred to herein to denote the scenario in which a pointer makes physical contact with the touch screen. For the position corresponding to the proximity touch of the pointer relative to the touch screen, such position will correspond to a position where the pointer is perpendicular to the touch screen. The proximity sensor 141 may sense proximity touch, and proximity touch patterns (for example, distance, direction, speed, time, position, moving status, and the like). In general, controller 180 processes data corresponding to proximity touches and proximity touch patterns sensed by the proximity sensor 141, and cause output of visual information on the touch screen. In addition, the controller 180 can control the mobile terminal 100 to execute different operations or process different data according to whether a touch with respect to a point on the touch screen is either a proximity touch or a contact touch.

A touch sensor can sense a touch applied to the touch screen, such as display unit 151, using any of a variety of touch methods.

Examples of such touch methods include a resistive type, a capacitive type, an infrared type, and a magnetic field type, among others. As one example, the touch sensor may be configured to convert changes of pressure applied to a specific part of the display unit 151, or convert capacitance occurring at a specific part of the display unit 151, into electric input signals. The touch sensor may also be configured to sense not only a touched position and a touched area, but also touch pressure and/or touch capacitance. A touch object is generally used to apply a touch input to the touch sensor. Examples of typical touch objects include a finger, a touch pen, a stylus pen, a pointer, or the like.

When a touch input is sensed by a touch sensor, corresponding signals may be transmitted to a touch controller. The touch controller may process the received signals, and then transmit corresponding data to the controller 180. Accordingly, the controller 180 can sense which region of the display unit 151 has been touched. Here, the touch controller may be a component separate from the controller 180, the controller 180, and combinations thereof.

In some embodiments, the controller 180 can execute the same or different controls according to a type of touch object that touches the touch screen or a touch key provided in addition to the touch screen. Whether to execute the same or different control according to the object which provides a touch input may be decided based on a current operating state of the mobile terminal 100 or a currently executed application program, for example.

The touch sensor and the proximity sensor may be implemented individually, or in combination, to sense various types of touches. Such touches includes a short (or tap) touch, a long touch, a multi-touch, a drag touch, a flick touch, a pinch-in touch, a pinch-out touch, a swipe touch, a hovering touch, and the like.

If desired, an ultrasonic sensor may be implemented to recognize position information relating to a touch object using ultrasonic waves. The controller 180, for example, may calculate a position of a wave generation source based on information sensed by an illumination sensor and a plurality of ultrasonic sensors. Since light is much faster than ultrasonic waves, the time for which the light reaches the optical sensor is much shorter than the time for which the ultrasonic wave reaches the ultrasonic sensor. The position of the wave generation source may be calculated using this fact. For instance, the position of the wave generation source may be calculated using the time difference from the time that the ultrasonic wave reaches the sensor based on the light as a reference signal.

The camera 121 typically includes at least one a camera sensor (CCD, CMOS etc.), a photo sensor (or image sensors), and a laser sensor.

Implementing the camera 121 with a laser sensor may allow detection of a touch of a physical object with respect to a 3D stereoscopic image.

The photo sensor may be laminated on, or overlapped with, the display device. The photo sensor may be configured to scan movement of the physical object in proximity to the touch screen.

In more detail, the photo sensor may include photo diodes and transistors at rows and columns to scan content received at the photo sensor using an electrical signal which changes according to the quantity of applied light. Namely, the photo sensor may calculate the coordinates of the physical object according to variation of light to thus obtain position information of the physical object.

The display unit 151 is generally configured to output information processed in the mobile terminal 100.

For example, the display unit 151 may display execution screen information of an application program executing at the mobile terminal 100 or user interface (UI) and graphic user interface (GUI) information in response to the execution screen information.

In some embodiments, the display unit 151 may be implemented as a stereoscopic display unit for displaying stereoscopic images.

A typical stereoscopic display unit may employ a stereoscopic display scheme such as a stereoscopic scheme (a glass scheme), an auto-stereoscopic scheme (glassless scheme), a projection scheme (holographic scheme), or the like.

The audio output module 152 is generally configured to output audio data. Such audio data may be obtained from any of a number of different sources, such that the audio data may be received from the wireless communication unit 110 or may have been stored in the memory 170. The audio data may be output during modes such as a signal reception mode, a call mode, a record mode, a voice recognition mode, a broadcast reception mode, and the like. The audio output module 152 can provide audible output related to a particular function (e.g., a call signal reception sound, a message reception sound, etc.) performed by the mobile terminal 100. The audio output module 152 may also be implemented as a receiver, a speaker, a buzzer, or the like.

A haptic module 153 can be configured to generate various tactile effects that a user feels, perceive, or otherwise experience. A typical example of a tactile effect generated by the haptic module 153 is vibration. The strength, pattern and the like of the vibration generated by the haptic module 153 can be controlled by user selection or setting by the controller. For example, the haptic module 153 may output different vibrations in a combining manner or a sequential manner.

Besides vibration, the haptic module 153 can generate various other tactile effects, including an effect by stimulation such as a pin arrangement vertically moving to contact skin, a spray force or suction force of air through a jet orifice or a suction opening, a touch to the skin, a contact of an electrode, electrostatic force, an effect by reproducing the sense of cold and warmth using an element that can absorb or generate heat, and the like.

The haptic module 153 can also be implemented to allow the user to feel a tactile effect through a muscle sensation such as the user's fingers or arm, as well as transferring the tactile effect through direct contact. Two or more haptic modules 153 may be provided according to the particular configuration of the mobile terminal 100.

An optical output module 154 can output a signal for indicating an event generation using light of a light source. Examples of events generated in the mobile terminal 100 may include message reception, call signal reception, a missed call, an alarm, a schedule notice, an email reception, information reception through an application, and the like.

A signal output by the optical output module 154 may be implemented so the mobile terminal emits monochromatic light or light with a plurality of colors. The signal output may be terminated as the mobile terminal senses that a user has checked the generated event, for example.

The interface unit 160 serves as an interface for external devices to be connected with the mobile terminal 100. For example, the interface unit 160 can receive data transmitted from an external device, receive power to transfer to elements and components within the mobile terminal 100, or transmit internal data of the mobile terminal 100 to such external device. The interface unit 160 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating authority of using the mobile terminal 100 and may include a user identity module (UIM), a subscriber identity module (SIM), a universal subscriber identity module (USIM), and the like. In addition, the device having the identification module (also referred to herein as an "identifying device") may take the form of a smart card. Accordingly, the identifying device can be connected with the terminal 100 via the interface unit 160.

When the mobile terminal 100 is connected with an external cradle, the interface unit 160 can serve as a passage to allow power from the cradle to be supplied to the mobile terminal 100 or may serve as a passage to allow various command signals input by the user from the cradle to be transferred to the mobile terminal there through. Various command signals or power input from the cradle may operate as signals for recognizing that the mobile terminal is properly mounted on the cradle.

The memory 170 can store programs to support operations of the controller 180 and store input/output data (for example, phonebook, messages, still images, videos, etc.). The memory 170 may store data related to various patterns of vibrations and audio which are output in response to touch inputs on the touch screen.

The memory 170 may include one or more types of storage mediums including a Flash memory, a hard disk, a solid state disk, a silicon disk, a multimedia card micro type, a card-type memory (e.g., SD or DX memory, etc.), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, an optical disk, and the like. The mobile terminal 100 may also be operated in relation to a network storage device that performs the storage function of the memory 170 over a network, such as the Internet.

The controller 180 can typically control the general operations of the mobile terminal 100. For example, the controller 180 can set or release a lock state for restricting a user from inputting a control command with respect to applications when a status of the mobile terminal meets a preset condition.

The controller 180 can also perform the controlling and processing associated with voice calls, data communications, video calls, and the like, or perform pattern recognition processing to recognize a handwriting input or a picture drawing input performed on the touch screen as characters or images, respectively. In addition, the controller 180 can control one or a combination of those components in order to implement various exemplary embodiments disclosed herein.

The power supply unit 190 receives external power or provide internal power and supply the appropriate power required for operating respective elements and components included in the mobile terminal 100. The power supply unit 190 may include a battery, which is typically rechargeable or be detachably coupled to the terminal body for charging.

The power supply unit 190 may include a connection port. The connection port may be configured as one example of the interface unit 160 to which an external charger for supplying power to recharge the battery is electrically connected. As another example, the power supply unit 190 may be configured to recharge the battery in a wireless manner without use of the connection port.

In this example, the power supply unit 190 can receive power, transferred from an external wireless power transmitter, using at least one of an inductive coupling method which is based on magnetic induction or a magnetic resonance coupling method which is based on electromagnetic resonance.

Various embodiments described herein may be implemented in a computer-readable medium, a machine-readable medium, or similar medium using, for example, software, hardware, or any combination thereof.

Referring now to FIGS. 1B and 1C, the mobile terminal 100 is described with reference to a bar-type terminal body. However, the mobile terminal 100 may alternatively be implemented in any of a variety of different configurations. Examples of such configurations include watch-type, clip-type, glasses-type, or as a folder-type, flip-type, slide-type, swing-type, and swivel-type in which two and more bodies are combined with each other in a relatively movable manner, and combinations thereof. Discussion herein will often relate to a particular type of mobile terminal (for example, bar-type, watch-type, glasses-type, and the like). However, such teachings with regard to a particular type of mobile terminal will generally apply to other types of mobile terminals as well.

The mobile terminal 100 will generally include a case (for example, frame, housing, cover, and the like) forming the appearance of the terminal.

In this embodiment, the case is formed using a front case 101 and a rear case 102. Various electronic components are incorporated into a space formed between the front case 101 and the rear case 102. At least one middle case may be additionally positioned between the front case 101 and the rear case 102.

The display unit 151 is shown located on the front side of the terminal body to output information. As illustrated, a window 151a of the display unit 151 may be mounted to the front case 101 to form the front surface of the terminal body together with the front case 101.

In some embodiments, electronic components may also be mounted to the rear case 102. Examples of such electronic components include a detachable battery 191, an identification module, a memory card, and the like. Rear cover 103 is shown covering the electronic components, and this cover may be detachably coupled to the rear case 102. Therefore, when the rear cover 103 is detached from the rear case 102, the electronic components mounted to the rear case 102 are externally exposed.

As illustrated, when the rear cover 103 is coupled to the rear case 102, a side surface of the rear case 102 is partially exposed. In some cases, upon the coupling, the rear case 102 may also be completely shielded by the rear cover 103. In some embodiments, the rear cover 103 may include an opening for externally exposing a camera 121b or an audio output module 152b.

The cases 101, 102, 103 may be formed by injection-molding synthetic resin or may be formed of a metal, for example, stainless steel (STS), aluminum (Al), titanium (Ti), or the like.

As an alternative to the example in which the plurality of cases form an inner space for accommodating components, the mobile terminal 100 may be configured such that one case forms the inner space. In this example, a mobile terminal 100 having a uni-body is formed so synthetic resin or metal extends from a side surface to a rear surface.

If desired, the mobile terminal 100 may include a waterproofing unit for preventing introduction of water into the terminal body.

For example, the waterproofing unit may include a waterproofing member which is located between the window 151a and the front case 101, between the front case 101 and the rear case 102, or between the rear case 102 and the rear cover 103, to hermetically seal an inner space when those cases are coupled.

The mobile terminal 100 may be provided with the display unit 151, the first audio output unit 152a, the second audio output unit 152b, the proximity sensor 141, the illumination sensor 142, the light output unit 154, the first camera 121a, the second camera 121b, the first manipulating unit 123a, the second manipulating unit 123b, the microphone 122, the interface unit 160, and the like.

FIGS. 1B and 1C depict certain components as arranged on the mobile terminal. However, alternative arrangements are possible and within the teachings of the instant disclosure. Some components may be omitted or rearranged. For example, the first manipulation unit 123a may be located on another surface of the terminal body, and the second audio output module 152b may be located on the side surface of the terminal body.

The display unit 151 outputs information processed in the mobile terminal 100. The display unit 151 may be implemented using one or more suitable display devices. Examples of such suitable display devices include a liquid crystal display (LCD), a thin film transistor-liquid crystal display (TFT-LCD), an organic light emitting diode (OLED), a flexible display, a 3-dimensional (3D) display, an e-ink display, and combinations thereof.

The display unit 151 may be implemented using two display devices, which can implement the same or different display technology. For instance, a plurality of the display units 151 may be arranged on one side, either spaced apart from each other, or these devices may be integrated, or these devices may be arranged on different surfaces.

The display unit 151 may also include a touch sensor which senses a touch input received at the display unit. When a touch is input to the display unit 151, the touch sensor may be configured to sense this touch and the controller 180, for example, may generate a control command or other signal corresponding to the touch. The content which is input in the touching manner may be text or a numerical value, or a menu item which can be indicated or designated in various modes.

The touch sensor may be configured in a form of a film having a touch pattern, disposed between the window 151a and a display on a rear surface of the window 151a, or a metal wire which is patterned directly on the rear surface of the window 151a. Alternatively, the touch sensor may be integrally formed with the display. For example, the touch sensor may be disposed on a substrate of the display or within the display.

The display unit 151 may also form a touch screen together with the touch sensor. Here, the touch screen may serve as the user input unit 123 (see FIG. 1A). Therefore, the touch screen may replace at least some of the functions of the first manipulation unit 123a.

The first audio output module 152a may be implemented in the form of a speaker to output voice audio, alarm sounds, multimedia audio reproduction, and the like. The window 151a of the display unit 151 will typically include an aperture to permit audio generated by the first audio output module 152a to pass.

One alternative is to allow audio to be released along an assembly gap between the structural bodies (for example, a gap between the window 151a and the front case 101). In this instance, a hole independently formed to output audio sounds may not be seen or is otherwise hidden in terms of appearance, thereby further simplifying the appearance and manufacturing of the mobile terminal 100.

The optical output module 154 can be configured to output light for indicating an event generation. Examples of such events include a message reception, a call signal reception, a missed call, an alarm, a schedule notice, an email reception, information reception through an application, and the like. When a user has checked a generated event, the controller can control the optical output unit 154 to stop the light output.

The first camera 121a can process image frames such as still or moving images obtained by the image sensor in a capture mode or a video call mode. The processed image frames can then be displayed on the display unit 151 or stored in the memory 170.

The first and second manipulation units 123a and 123b are examples of the user input unit 123, which may be manipulated by a user to provide input to the mobile terminal 100. The first and second manipulation units 123a and 123b may also be commonly referred to as a manipulating portion, and may employ any tactile method that allows the user to perform manipulation such as touch, push, scroll, or the like. The first and second manipulation units 123a and 123b may also employ any non-tactile method that allows the user to perform manipulation such as proximity touch, hovering, or the like.

FIG. 1B illustrates the first manipulation unit 123a as a touch key, but possible alternatives include a mechanical key, a push key, a touch key, and combinations thereof.

Input received at the first and second manipulation units 123a and 123b may be used in various ways. For example, the first manipulation unit 123a may be used by the user to provide an input to a menu, home key, cancel, search, or the like, and the second manipulation unit 123b may be used by the user to provide an input to control a volume level being output from the first or second audio output modules 152a or 152b, to switch to a touch recognition mode of the display unit 151, or the like.

As another example of the user input unit 123, a rear input unit may be located on the rear surface of the terminal body.

The rear input unit can be manipulated by a user to provide input to the mobile terminal 100. The input may be used in a variety of different ways. For example, the rear input unit may be used by the user to provide an input for power on/off, start, end, scroll, control volume level being output from the first or second audio output modules 152a or 152b, switch to a touch recognition mode of the display unit 151, and the like. The rear input unit may be configured to permit touch input, a push input, or combinations thereof.

The rear input unit may be located to overlap the display unit 151 of the front side in a thickness direction of the terminal body. As one example, the rear input unit may be located on an upper end portion of the rear side of the terminal body such that a user can easily manipulate it using a forefinger when the user grabs the terminal body with one hand. Alternatively, the rear input unit can be positioned at most any location of the rear side of the terminal body.

Embodiments that include the rear input unit may implement some or all of the functionality of the first manipulation unit 123a in the rear input unit. As such, in situations where the first manipulation unit 123a is omitted from the front side, the display unit 151 can have a larger screen.

As a further alternative, the mobile terminal 100 may include a finger scan sensor which scans a user's fingerprint. The controller 180 can then use fingerprint information sensed by the finger scan sensor as part of an authentication procedure. The finger scan sensor may also be installed in the display unit 151 or implemented in the user input unit 123.

The microphone 122 is shown located at an end of the mobile terminal 100, but other locations are possible. If desired, multiple microphones may be implemented, with such an arrangement permitting the receiving of stereo sounds.

The interface unit 160 may serve as a path allowing the mobile terminal 100 to interface with external devices. For example, the interface unit 160 may include one or more of a connection terminal for connecting to another device (for example, an earphone, an external speaker, or the like), a port for near field communication (for example, an Infrared Data Association (IrDA) port, a Bluetooth port, a wireless LAN port, and the like), or a power supply terminal for supplying power to the mobile terminal 100. The interface unit 160 may be implemented in the form of a socket for accommodating an external card, such as Subscriber Identification Module (SIM), User Identity Module (UIM), or a memory card for information storage.

The second camera 121b is shown located at the rear side of the terminal body and includes an image capturing direction that is substantially opposite to the image capturing direction of the first camera unit 121a. If desired, second camera 121a may alternatively be located at other locations, or made to be moveable, in order to have a different image capturing direction from that which is shown.

The second camera 121b can include a plurality of lenses arranged along at least one line. The plurality of lenses may also be arranged in a matrix configuration. The cameras may be referred to as an "array camera." When the second camera 121b is implemented as an array camera, images may be captured in various manners using the plurality of lenses and images with better qualities.

As shown in FIG. 1C, a flash 124 is shown adjacent to the second camera 121b. When an image of a subject is captured with the camera 121b, the flash 124 may illuminate the subject.

As shown in FIG. 1C, the second audio output module 152b can be located on the terminal body. The second audio output module 152b may implement stereophonic sound functions in conjunction with the first audio output module 152a, and may be also used for implementing a speaker phone mode for call communication.

At least one antenna for wireless communication may be located on the terminal body. The antenna may be installed in the terminal body or formed by the case. For example, an antenna which configures a part of the broadcast receiving module 111 may be retractable into the terminal body. Alternatively, an antenna may be formed using a film attached to an inner surface of the rear cover 103, or a case that includes a conductive material.

A power supply unit 190 for supplying power to the mobile terminal 100 may include a battery 191, which is mounted in the terminal body or detachably coupled to an outside of the terminal body. The battery 191 may receive power via a power source cable connected to the interface unit 160. Also, the battery 191 can be recharged in a wireless manner using a wireless charger. Wireless charging may be implemented by magnetic induction or electromagnetic resonance.

The rear cover 103 is shown coupled to the rear case 102 for shielding the battery 191, to prevent separation of the battery 191, and to protect the battery 191 from an external impact or from foreign material. When the battery 191 is detachable from the terminal body, the rear case 103 may be detachably coupled to the rear case 102.

An accessory for protecting an appearance or assisting or extending the functions of the mobile terminal 100 can also be provided on the mobile terminal 100. As one example of an accessory, a cover or pouch for covering or accommodating at least one surface of the mobile terminal 100 may be provided. The cover or pouch may cooperate with the display unit 151 to extend the function of the mobile terminal 100. Another example of the accessory is a touch pen for assisting or extending a touch input to a touch screen.

For clarity of explanation, assume that the mobile terminal according to an embodiment of the present invention includes at least one selected from the group including configuration elements shown in FIG. 1A to FIG. 1C. Specifically, assume that the mobile terminal according to an embodiment of the present invention includes a wireless communication unit 110, a microphone 122, a display unit 151, a memory 170 and a controller 180. In an embodiment described in the following, assume that the display unit 151 corresponds to a touch screen. Hence, the display unit 151 can function not only as an output device outputting information but also as an input device receiving a touch input. Yet, a touch input can be replaced with a push input pushing a button, a gesture input moving a mobile terminal or the like. Further, a person using the mobile terminal according to the present invention is called a user in embodiments described in the following. Meanwhile, according to the present invention, it is able to display information processed by the mobile terminal using a flexible display. This shall be described in detail based on the accompanying drawings.

Figure 2:
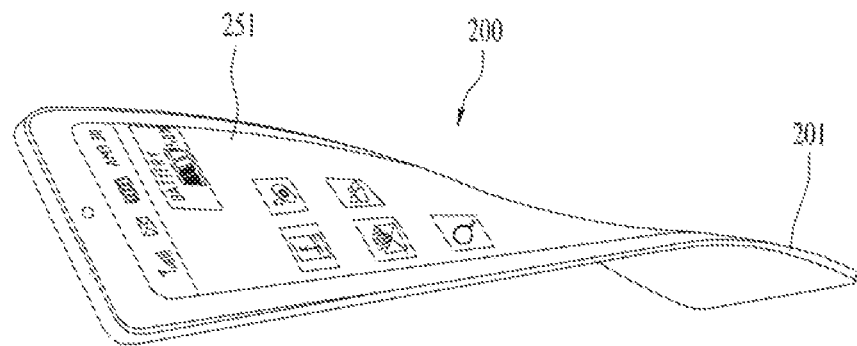
FIG. 2 is a conceptual diagram of a deformable mobile terminal according to an alternative embodiment of the present disclosure.

FIG. 2 is a conceptual view to describe another example of a deformable mobile terminal 200 according to the present invention.

As shown in the drawing, a display unit 251 may be configured deformable in response to an external force. This deformation may include at last one of curving, bending, folding, twisting, rolling, and combinations thereof. The deformable display unit 251 may be named "flexible display unit". In particular, the flexible display unit 251 may include a general flexible display, an electronic paper (also known as e-paper), and a combination thereof. In general, a mobile terminal 200 may be configured to include the same or similar features of the former mobile terminal 100 shown in FIGS. 1A to 1C.

Generally, a flexible display means a display that is light-weighted and non-fragile in a manner of being fabricated on a thin and flexible substrate having such properties of paper as curving, bending, folding, twisting, and rolling while maintaining the properties of an existing flat panel display.

The e-paper may be used to refer to a display technology that employs the properties of a general ink. The e-paper is different from the existing flat panel display in using reflective light. The e-paper is generally understood as changing displayed information by electrophoresis using twist balls or capsules.

In a state that the flexible display unit 251 is not deformed (for example, a state that the flexible display unit 251 has an infinite radius of curvature, referred to as a $1^{st}$ state), a display region of the flexible display unit 251 becomes a flat surface. In a state that the flexible display unit 251 is deformed from the $1^{st}$ state by an external force (for example, a state that the flexible display unit 251 has a finite radius of curvature, referred to as a $2^{nd}$ state), the display region may become a curved surface or a bent surface. As illustrated, information displayed in the second state may include visual information outputted through the curved surface. The visual information may be implemented in a manner that light emission of each unit pixel (sub-pixel) arranged in a matrix configuration is controlled independently. In this case, the unit pixel denotes an elementary unit for representing a single color.

The flexible display unit 251 may enter not a flat state but a curved state (for example, a vertically curved state, a horizontally curved state, etc.) in the $1^{st}$ state. In doing so, if an external force is applied to the flexible display unit 251, the flexible display unit 251 may be deformed into a flat state (or a less curved state) or a more curved state.

If desired, the flexible display unit 251 may embody a flexible touchscreen by being combined with a touch sensor. If a touch is applied to the flexible touchscreen, the controller 180 (cf. FIG. 1A) can perform a control in response to the touch input. The flexible touchscreen may be configured to sense a touch input not only in the $1^{st}$ state but also in the $2^{nd}$ state.

Meanwhile, the mobile terminal 200 according to the modified example may include a deformation sensing means for sensing the deformation of the flexible display unit 251. The deformation sensing means may be included in the sensing unit 140 shown in FIG. 1A.

The deformation sensing means is provided to the flexible display unit 251 or the case 201 to sense information related to the deformation of the flexible display unit 251. Examples of such information related to the deformation of the flexible display unit 251 may include a deformed direction of the flexible display unit 251, a deformed degree of the flexible display unit 251, a deformed position of the flexible display unit 251, a deformed time of the flexible display unit 251, an acceleration for restoring the deformed flexible display unit 251, and the like. Besides, the information may include various kinds of information that can be sensed owing to the curving of the flexible display unit 251.

The controller 180 can change the information displayed on the flexible display unit 251 or generate a control signal for controlling a function of the mobile terminal 200, based on the information related to the deformation of the flexible display unit 251. Such information is typically sensed by the deformation sensing means.

The mobile terminal 200 according to the modified example may include a case 201 for accommodating the flexible display unit 251. The case 201 can be configured deformable together with the flexible display unit 251 in consideration of the property of the flexible display unit 251.

A battery (not shown in the drawing) provided to the mobile terminal 200 may be configured deformable by an external force together with the flexible display unit 251 in consideration of the property of the flexible display unit 251. In order to embody such a battery, it is able to employ a stack and folding scheme of stacking battery cells on each other.

The state deformation of the flexible display unit 251 is non-limited by the case of applying the external force. For example, the flexible display unit 251 can be deformed into the $2^{nd}$ state in response a command given by a user or application when the flexible display unit 251 is in the $1^{st}$ state.

Beyond using a mobile terminal grabbed with a user's hand, the mobile terminal may extend to a wearable device that is wearable on a user body. Examples of the wearable device include a smart watch, a smart glass, a head mounted display (HMD), and the like. Examples of the mobile terminal extending to the wearable devices shall be described as follows.

First of all, a typical wearable device can exchange data with (or interwork with) another mobile terminal 100. The short-range communication module 114 can sense or recognize a nearby wearable device capable of communicating with the mobile terminal 100. Moreover, if the sensed wearable device is a device authenticated to communicate with the mobile terminal 100, the controller 180 may transmit at least one portion of the data processed in the mobile terminal 100 to the wearable device via the short-range communication module 114, for example. Hence, a user can use the data processed in the mobile terminal 100 through the wearable device. For example, when an incoming call is received by the mobile terminal 100, the user can answer the incoming call through the wearable device. When a message is received by the mobile terminal 100, the user can check the received message through the wearable device.

Figure 3:
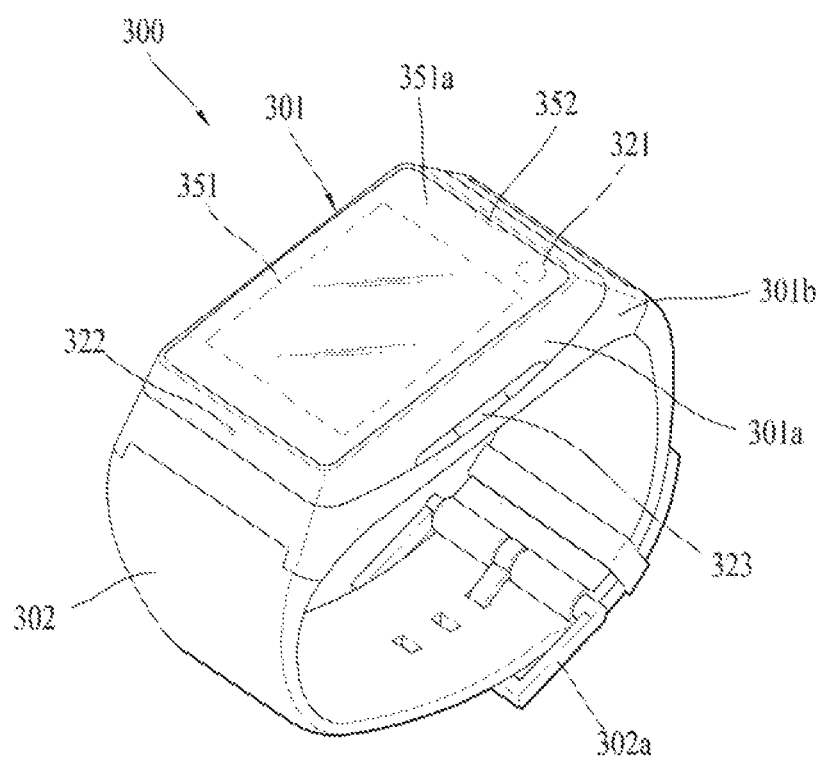
FIG. 3 is a perspective diagram for one example of a watch-type mobile terminal related to another embodiment of the present invention.

FIG. 3 is a perspective diagram for one example of a watch type mobile terminal 300 related to another embodiment of the present invention.

Referring to FIG. 3, a mobile terminal 300 of a watch type may include a main body 301 having a display unit 351 and a band 302 connected to the main body 301 to be wearable on a wrist. In general, the mobile terminal 300 may be configured to include features that are the same or similar to those of the former mobile terminal 100 shown in FIGS. 1A to 1C.

The main body 301 may include a case forming a certain appearance or exterior. As illustrated, the case may include a $1^{st}$ case 301a and a $2^{nd}$ case 301b configured to cooperatively provide an inner space for accommodating various electronic components therein, by which the present invention is non-limited. For instance, a single case is configured to provide the inner space, thereby embodying the mobile terminal 300 of a uni-body type.

The watch type mobile terminal 300 is configured to perform wireless communication, and an antenna for the wireless communication can be installed in the main body 301. It is able to expand performance of the antenna using the case. For example, a case containing a conductive material is electrically connected to the antenna to extend a ground region or a radiation region.

The display unit 351 is disposed on the front side of the main body 301 so as to output information. The display unit 351 is provided with a touch sensor so as to be embodied into a touchscreen. As illustrated, a window 351a of the display unit 251 is mounted on the $1^{st}$ case 301a to form a front surface of the terminal body together with the $1^{st}$ case 301a.

The main body 301 may be provided with an audio output unit 352, a camera 321, a microphone 322, a user input unit 323 and the like. In case that the display unit 351 is embodiment into the touchscreen, it can function as a user input unit 323. Hence, a separate key may not be provided to the main body 301.

The band 302 is configured to be worn on a wrist by enclosing the wrist. And, the band 302 may be formed of a flexible material for facilitating the wearing of the device. As one example, the band 302 may be made of leather, rubber, silicon, synthetic resin, and/or the like. As the band 302 is configured detachable from the main body 301, the band 302 may be substituted with various types of bands according to a user's preference.

Meanwhile, the band 302 may be used to expand the performance of the antenna. For example, a ground extending portion (not shown in the drawing) for extending a ground region by being electrically connected to the antenna may be built in the band 302.

The band 302 may include a fastener 302a. The fastener 302a may be embodied into a buckle type, a snap-fit hook structure, a Velcro® type, and/or the like. The fastener 302a may include a retractile section or material. According to the example shown in the present drawing, the fastener 302a is embodied into the buckle type.

Figure 4:
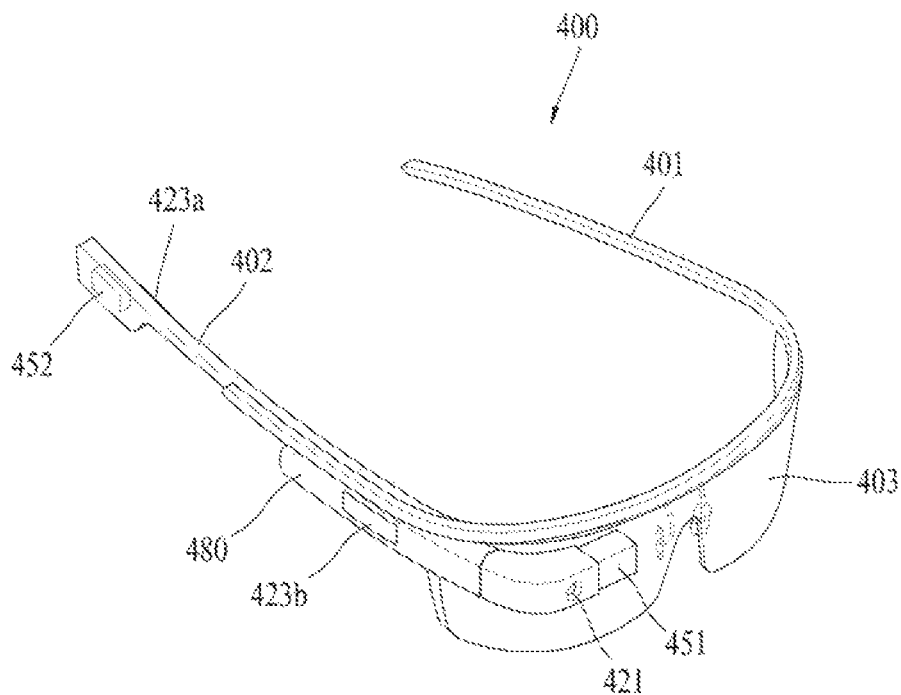
FIG. 4 is a perspective diagram for one example of a glass-type mobile terminal related to further embodiment of the present invention.

FIG. 4 is a perspective diagram for one example of a glass type mobile terminal related to further embodiment of the present invention.

Referring to FIG. 4, the glass type mobile terminal 400 is configured wearable on a head of a human body. To this end, the glass type mobile terminal 400 may include a frame unit (e.g., a case, a housing, etc.). The frame unit may be formed of a flexible material to be easily wearable. According to the example shown in the drawing, the frame unit of the mobile terminal 400 includes a $1^{st}$ frame 401 and a $2^{nd}$ frame 402, each of which can be made of a different material. In general, the mobile terminal 400 may have the same or similar features of the former mobile terminal 100 shown in FIGS. 1A to 1C.

The frame unit may be supported by the head and provides a space for mounting various components therein. As illustrated, electronic components such as a control module 480, an audio output unit 452 and the like may be installed in the frame unit. And, a lens 403 configured to cover at least one of the left and the right eye may be detachably installed in the frame unit.

The control module 480 is configured to control various electronic components provided to the mobile terminal 400. It may be appreciated that the control module 480 has the configuration corresponding to the aforementioned controller 180. According to the example shown in the present drawing, the control module 480 is installed in the frame unit on one side of the head, by which a location of the control module 480 is non-limited.

The display unit 451 may be embodied into a head mounted display (HMD). The HMD refers to a display system for directly projecting an image in front of user's eyes in a manner of being mounted on the head. In order to provide an image directly in front of the user's eyes, when the user wears the glass type mobile terminal 400, the display unit 451 may be disposed to correspond to at least one of the left eye and the right eye. According to the example shown in the present drawing, the display unit 451 is situated at a location corresponding to the right eye in order to output an image toward the user's right eye.

The display unit 451 may project an image into the user's eye using a prism. And, the prism may be formed to be optically transparent so that the user can watch the projected image and a general visual field (i.e., a range viewed by a user through the corresponding eye) in front of the user.

Thus, the image outputted through the display unit 451 may be viewed in a manner of overlapping the general visual field. The mobile terminal 400 can provide AR (Augmented Reality) by overlaying a virtual image on a real image or a background using the property of the display.

The camera 421 may be disposed adjacent to at least one of the left eye and the right eye to photograph an image in front. Since the camera 421 is situated adjacent to the eye, the camera 421 can obtain an image of a scene currently viewed by the user.

According to the example shown in the preset drawing, the camera 421 is provided to the control module 480, by which the present invention is non-limited. Alternatively, the camera 421 may be installed in the frame unit. Alternatively, a plurality of cameras may be provided to obtain stereoscopic images.

The glass type mobile terminal 400 may include user input units 423a and 423b manipulated to receive an input of a control command. The user input units 423a and 423b may employ any manners (e.g., touch, push, etc.) corresponding to a tactile manner in which a user can perform manipulations by experiencing a tactile sense. According to the example shown in the present drawing, the user input units 423a and 423b of the push input manner and the touch input manner are provided to the frame unit and the control module 480, respectively.

Moreover, the mobile terminal 400 may further include a microphone (not shown in the drawing) for receiving an input of a sound and then processing the input sound into electric audio data and an audio output module 452 for outputting audio. The audio output module 452 may be configured to transfer audio in a general audio output manner or an osteoconductive manner. In case that the audio output unit 452 is embodied in the osteoconductive manner, when the user wears the mobile terminal 400, the audio output unit 452 comes in close contact with a user's head and vibrates user's skull to transfer audio.

A communication system that can be embodied through the mobile terminal 100 according to the present invention is described in detail as follows.

First of all, a communication system may be configured to utilize any of a variety of different air interfaces and/or physical layers. Examples of such air interfaces utilized by the communication system include Frequency Division Multiple Access (FDMA), Time Division Multiple Access (TDMA), Code Division Multiple Access (CDMA), Universal Mobile Telecommunications System (UMTS) (including, Long Term Evolution (LTE), LTE-A (Long Term Evolution-Advanced)), Global System for Mobile Communications (GSM), and the like.

For clarity, the following description is limited to CDMA only. Yet, it is apparent that the present invention applies equally to other system types including not only CDMA wireless communication system but also OFDM (Orthogonal Frequency Division Multiplexing) wireless communication system.

The CDMA wireless communication system generally includes at least one terminal 100, at least one base station (BS) (possibly named Node B or Evolved Node B), at least one or more base station controllers (BSCs), and a mobile switching center (MSC). The MSC is configured to be connected to a conventional Public Switched Telephone Network (PSTN) and the BSCs. The BSCs are coupled to the base stations to pair with via backhaul line. The backhaul line may be provided in accordance with at least one of E1/T1, ATM, IP, PPP, Frame Relay, HDSL, ADSL, and xDSL. Hence, a plurality of BSCs can be included in the CDMA wireless communication system.

Each of a plurality of BSs (base stations) may include at least one or more sectors. And, each of the sectors may include an omni-directional antenna or an antenna indicating a specific direction radially away from the BS. Alternatively, each of the sectors may include two or more antennas of various types. Each of the BSs may be configured to support a plurality of frequency assignments. And, each of a plurality of the frequency assignments may have a specific spectrum (e.g., 1.25 MHz, 5 MHz, etc.).

The intersection of sector and frequency assignment may be referred to as a CDMA channel. The base stations may also be referred to as Base Station Transceiver Subsystems (BTSs). In this case, the term "base station" may be used to refer collectively to one BSC and at least one BS. The base stations may indicate "cell site." Moreover, each of a plurality of sectors for a specific BS may be referred to as a plurality of cell sites.

A broadcasting transmitter (BT) transmits a broadcast signal to the mobile terminals 100 operating within the system. The broadcast receiving module 111 shown in FIG. 1A is typically configured inside the mobile terminal 100 to receive broadcast signals transmitted by the BT.

Moreover, Global Positioning System (GPS) for locating the position of the mobile terminal 100 may cooperate with the CDMA wireless communication system. The satellite 300 helps to obtain a location of the mobile terminal 100. Useful position information may be obtained with greater or fewer satellites than two. In doing so, it is able to trace a location of the mobile terminal 100 using all technologies capable of tracing locations or positions as well as the GPS tracking technology. If desired, at least one of the GPS satellites may be in charge of satellite DMB transmissions optionally or additionally.

The location information module 115 provided to the mobile terminal is generally configured to detect, calculate, or otherwise identify a position or location of the mobile terminal. As a representative example, the location information module 115 may include a Global Position System (GPS) module, a Wi-Fi (wireless fidelity) module, or both. If desired, the location information module 115 may alternatively or additionally function as any of the other modules of the wireless communication unit 110 to obtain data related to the position or location of the mobile terminal.

The GPS module 115 accurately calculates a current 3D location information according to latitude, longitude and latitude by measuring an accurate time and distance from three or more satellites and then applying trigonometry to the calculated informations. Currently, a method of acquiring distance and time information from three satellites and performing error correction with a single satellite is popularly used. Moreover, the GPS module 115 can acquire speed information by continuing to calculate a real-time current location. Yet, accuracy of a measured location or position of the mobile terminal may be compromised when the mobile terminal is located in such a blind spot of satellite signals as an indoor space or the like. In order to compensate the measured location by GPS system, it is able to use Wi-Fi Positioning System (WPS) and the like.

The Wi-Fi positioning system (WPS) is the location determination technology based on a wireless local area network (WLAN) using Wi-Fi as a technology for tracking the location of the mobile terminal 100. This technology typically includes the use of a Wi-Fi module in the mobile terminal 100 and a wireless access point for communicating with the Wi-Fi module.

The Wi-Fi positioning system may include a Wi-Fi location determination server, a mobile terminal 100, a wireless access point (AP) connected to the mobile terminal 100, and a database storing random wireless AP information.

The mobile terminal 100 currently connected to the wireless AP may send a location information request message to the Wi-Fi location determination server.

The Wi-Fi location determination server extracts the information of the wireless AP connected to the mobile terminal 100, based on the location information request message (or signal) of the mobile terminal 100. The information of the wireless AP connected to the mobile terminal 100 may be sent to the Wi-Fi location determination server through the mobile terminal 100, or sent to the Wi-Fi location determination server from the wireless AP.

The information of the wireless AP extracted based on the location information request message of the mobile terminal 100 may include at least one of media access control (MAC) address, service set identification (SSID), received signal strength indicator (RSSI), reference signal received Power (RSRP), reference signal received quality (RSRQ), channel information, privacy, network type, signal strength, noise strength, and the like.

As mentioned in the above description, the Wi-Fi location determination server receives the information of the wireless AP connected to the mobile terminal 100 and may be then able to extract wireless AP information corresponding to the wireless AP connected to the mobile terminal from the pre-established database. In this case, the information of any wireless APs stored in the database may include information such as MAC address, SSID, RSSI, channel information, privacy, network type, latitude and longitude coordinate, building at which the wireless AP is located, floor number, detailed indoor location information (GPS coordinates available), AP owner's address, phone number, and the like. In doing so, in order to remove a mobile AP or a wireless AP provided using an illegal MAC address in the course of a location determining process, the Wi-Fi location determination server may extract only a prescribed number of wireless AP informations in order of high RSSI.

Thereafter, the Wi-Fi location determination server may extract (analyze) location information of the mobile terminal 100 using at least one wireless AP information extracted from the database. By comparing the included information and the received wireless AP information to each other, the location information of the mobile terminal 100 is extracted (or analyzed).

As a method for extracting (or analyzing) the location information of the mobile terminal 100, it is able to utilize a Cell-ID scheme, a fingerprint scheme, a trigonometry scheme, a landmark scheme and the like.

The Cell-ID scheme is used to determine a location of a wireless AP having the largest signal strength among peripheral wireless AP informations collected by a mobile terminal as a location of the mobile terminal. The Cell-ID scheme has advantages as follows. First of app, Implementation of the Cell-ID scheme is minimally complicated. Secondly, the Cell-ID scheme does not require additional costs. Thirdly, location information can be rapidly acquired. Yet, the Cell-ID scheme has the disadvantage in that the precision of positioning may fall below a desired threshold when the installation density of wireless APs is low.

The fingerprint scheme is a method of estimating a location through a signal strength information transmitted by a mobile terminal based on information collected by selecting a reference location from a service area. In order to use the fingerprint scheme, it is necessary to establish database of propagation characteristics in advance.

The trigonometry scheme is used to calculate a location of a mobile terminal based on a distance between coordinates of at least three wireless APs and the mobile terminal. In order to measure the distances between the mobile terminal and the wireless APs, signal strength may be converted into distance information, or Time of Arrival (ToA), Time Difference of Arrival (TDoA), Angle of Arrival (AoA) and the like may be used.

The landmark scheme is used to measure a location or position of a mobile terminal using a known landmark transmitter.

In addition to the above-listed schemes, various algorithms may be used to extract (or analyze) location information of a mobile terminal.

Such extracted location information may be transmitted to the mobile terminal 100 through the Wi-Fi location determination server, whereby the mobile terminal can acquire the location information.

The mobile terminal 100 can acquire location information by being connected to at least one wireless AP. In doing so, the number of wireless APs required for acquiring the location information of the mobile terminal 100 may be variously changeable depending on a wireless communication environment in which the mobile terminal 100 is situated.

As mentioned in the foregoing description with reference to FIG. 1A, short-range communication techniques such as Bluetooth™, Radio Frequency Identification (RFID), Infrared Data Association (IrDA), Ultra Wideband (UWB), ZigBee, Near Field Communication (NFC), Wireless USB (Wireless Universal Serial Bus) and the like may apply to the mobile terminal according to the present invention.

Among the short-range communication technologies, NFC module provided to the mobile terminal supports an inter-terminal non-contact type short-range wireless communication in a distance of about 10 cm range. The NFC module may operate in one of a card mode, a reader mode and a P2P mode. The mobile terminal 100 may further include a security module for storing card information in order to for the NFC module in the card mode. In this case, the security module may include one of a physical medium such as Universal Integrated Circuit Card (UICC) (e.g., Subscriber Identification Module (SIM), Universal SIM (USIM), etc.), Secure micro SD, a sticker and the like, or a logical medium (e.g., embedded Secure Element (SE), etc.) embedded in the mobile terminal. Data exchange may be performed between the NFC module and the security module based on Single Wire Protocol (SWP).

In a case that the NFC module operates in the card mode, the mobile terminal may externally transfer card information saved like a traditional IC card.

In particular, if a mobile terminal storing card information of a payment card (e.g., a credit card, a bus card, etc.) approaches a card reader, a short-range mobile payment may be processed. If a mobile terminal storing card information of an entrance card approaches an entrance card reader, an entrance approval procedure may start. A card such as a credit card, a traffic card, or an entrance card may be loaded on the security module in the form of applet, and the security module may store card information on the loaded card.

In this case, the card information of the payment card may include at least one of a card number, a remaining amount, a use history, and the like. The card information of the entrance card may include at least one of a user's name, a user's number (e.g., a user's student number, a user's staff number, etc.), an entrance history, and the like.

In case that the NFC module operates in the reader mode, the mobile terminal can read data from an external tag. In doing so, the data received from the external tag by the mobile terminal may be coded in NFC Data Exchange Format defined by NFC Forum. And, the NFC Forum generally defines four record types. In particular, the NFC Forum defines four Record Type Definitions (RTDs) such as Smart Poster, Text, Uniform Resource Identifier (URI), General Control and the like. If the data received from the external tag is a smart poster type, the controller can run a browser (e.g., Internet browser, etc.). If the data received from the external tag is a text type, the controller can run a text viewer. If the data received from the external tag is a URI type, the controller can run a browser or make a phone call. If the data received from the external tag is a general control type, the controller can execute an accurate operation in accordance with control contents.

In case that the NFC module operates in the P2P (Peer-to-Peer) mode, the mobile terminal can perform P2P communication with another mobile terminal. In this case, Logical Link Control Protocol (LLCP) can apply to the P2P communication. For the P2P communication, connection may be created between one mobile terminal and another mobile terminal. In this case, the connection may be categorized into a connectionless mode terminated after switching a single packet or a connection-oriented mode for exchanging packets consecutively. Through the P2P communication, data such as an electronic type business card, a contact information, a digital photo, a URL and the like, setup parameters for Bluetooth connection, Wi-Fi connection, etc. can be exchanged. Yet, the P2P mode can be effectively utilized in exchanging data in small size because an available distance for the NFC communication is relatively short.

Embodiments related to a controlling method implemented in the above-configured mobile terminal shall be described in more detail with reference to the accompanying drawings. It is understood by those skilled in the art that the present features can be embodied in several forms without departing from the characteristics thereof.

Although the present specification is described by taking the mobile terminal 100 shown in FIGS. 1A to 1C as one example, it is a matter of course that embodiments of the present invention are applicable to the mobile terminals 200, 300 and 400 described with reference to FIGS. 2 to 4.

Figure 5:
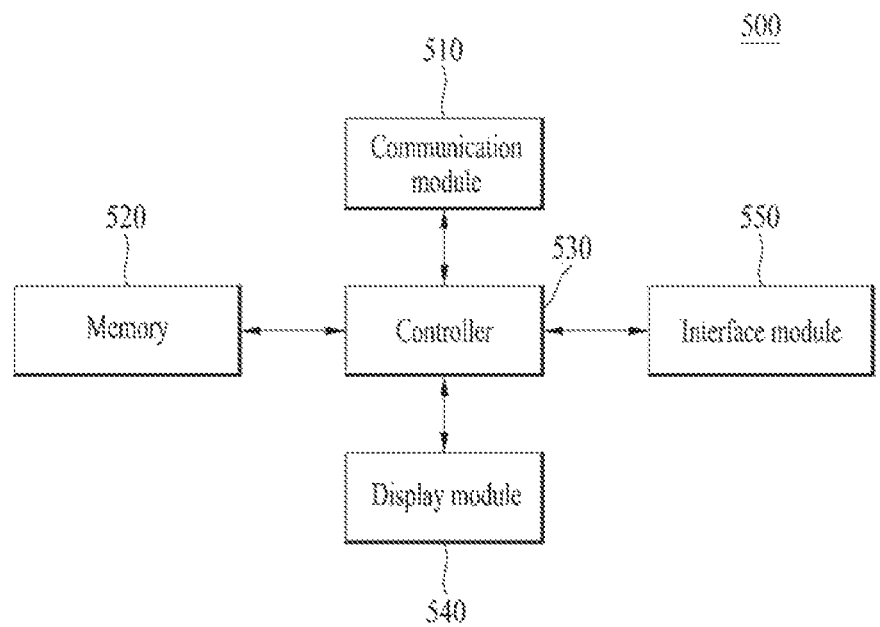
FIG. 5 is a diagram for configuration of a mobile device according to one embodiment of the present invention.

FIG. 5 is a diagram for configuration of a mobile device according to one embodiment of the present invention.

Referring to FIG. 5, a mobile device 500 includes a communication module 510, an interface module 520, a controller 530, a display module 540 and a memory 550.

The communication module 510 transceives data with a first external device and a second external device.

The memory 520 stores recipient information including at least one of a recipient phone number and a recipient email address.

The controller 530 receives a first text through the communication module 510 from the memory 520 or the first external device, obtains recipient information from the memory 520, determines a priority based on the obtained recipient information, generates a second text based on the determined priority and the received first text, displays the generated second text on a screen, and sends the displayed second text to the second external device, which is different from the first external device corresponding to the recipient information, through the communication module 510.

The controller 530 determines the priority based on at least one of a position information in the received recipient information and a text message content corresponding to the recipient.

This shall be described in detail with reference to FIG. 9 later.

The first text further includes time information, and the controller 530 generates a second text by reflecting the time information.

In particular, if the time information is an absolute time, the controller 530 generates the second text without changing the time information. If the time information is a relative time, the controller 530 changes the time information by considering an elapse time from a timing of receiving the first text to a current timing and then generates the second text by reflecting the changed time information.

This shall be described in detail with reference to FIG. 11 later.

The controller 530 compares the first text with the generated second text, displays a changed part differently from an existing part of the first text based on a result of the comparison, and displays the second text on the screen by reflecting the displayed changed part.

This shall be described in detail with reference to FIG. 12 later.

If receiving a touch input over a prescribed time to the changed part from a user, the controller 530 displays a message box for modifying the changed part.

This shall be described in detail with reference to FIG. 12 later.

The controller 530 generates a second text per recipient information based on the determined priority and the received first text.

This shall be described in detail with reference to FIG. 13 later.

If the priority is a first priority, the controller 530 generates the second text by changing at least one of a subject, object and verb of the first text into a honorific. If the priority is a second priority, the controller 530 generates the second text by changing at least one of a subject, object and verb of the second text into plain terms.

This shall be described in detail with reference to FIG. 13 later.

If receiving a touch input to a specific part of the mobile device over a prescribed time from a user through the interface module, the controller 530 displays a message box for changing a priority.

This shall be described in detail with reference to FIG. 13 later.

The controller 530 obtains sender information corresponding to the first external device from the memory 520, determines a priority with a user based on the obtained sender information, receives a specific input corresponding to the received first text from the user, generates a third text based on the determined priority and the received specific input, and sends the generated third text to the first external device.

This shall be described in detail with reference to FIGS. 16 to 23 later.

The display module 540 displays a text in response to a control command from the controller 530.

The interface module 550 receives a touch input from the user.

Figure 6:
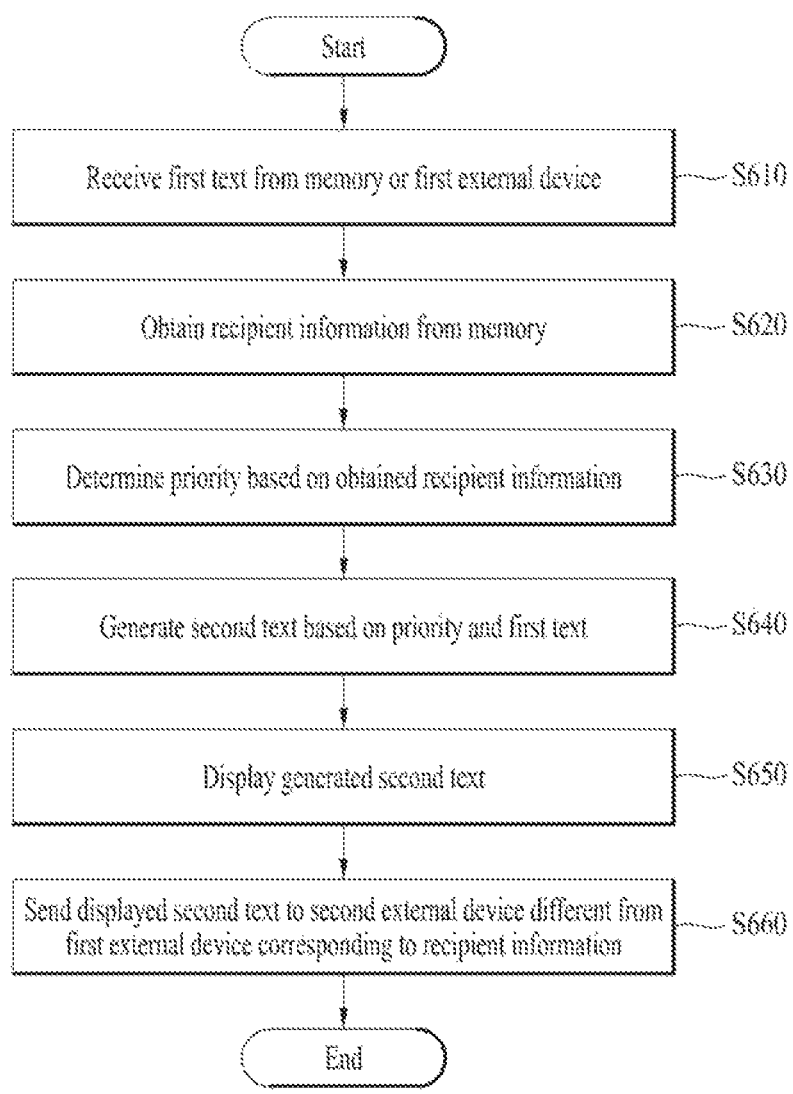
FIG. 6 is a flowchart of a method of controlling a mobile device according to one embodiment of the present invention.

FIG. 6 is a flowchart of a method of controlling a mobile device according to one embodiment of the present invention. The present invention is performed by the controller 530.

Referring to FIG. 6, a first text is received from the memory 520 or the first external device [S610].

At least one recipient information including at least one of a recipient phone number and a recipient email address is obtained from the memory 520 [S620].

A priority is determined based on the obtained recipient information [S630].

A second text is generated based on the determined priority and the received first text [S640].

The generated second text is displayed on a screen [S650].

The displayed second text is sent to a second external device different from the first external device corresponding to the recipient information [S660].

Figure 7:
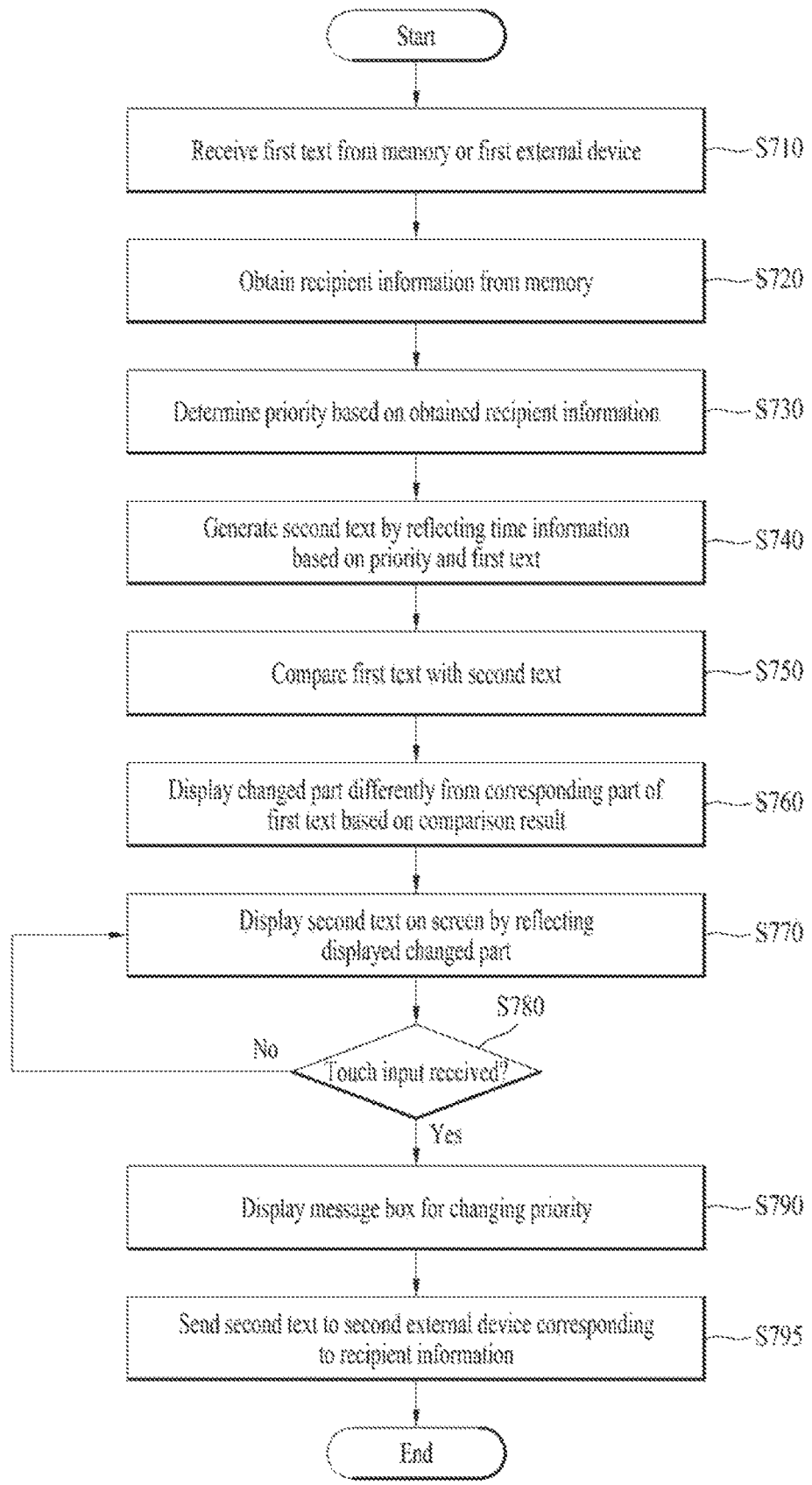
FIG. 7 is a flowchart of a method of controlling a mobile device according to one embodiment of the present invention.

FIG. 7 is a flowchart of a method of controlling a mobile device according to one embodiment of the present invention. The present invention is performed by the controller 530.

Referring to FIG. 7, a first text is received from the memory 520 or the first external device [S710].

At least one recipient information including at least one of a recipient phone number and a recipient email address is obtained from the memory 520 [S720].

A priority is determined based on the obtained recipient information [S730].

A second text is generated based on the determined priority and the received first text [S740].

The first text is compared with the generated second text [S750].

A changed part is displayed differently from a corresponding part of the first text based on a result of the comparison [S760].

The second text is displayed on a screen by reflecting the displayed changed part [S770].

It is checked whether a touch input over a prescribed time to a specific part of the mobile device is received from a user [S780].

If the touch input is received, a message box for changing a priority is displayed [S790]. If the touch input over the prescribed time is not received, the controller 530 stands by for a touch input reception.

The displayed second text is sent to a second external device different from the first external device corresponding to the recipient information [S795].

Figure 8:
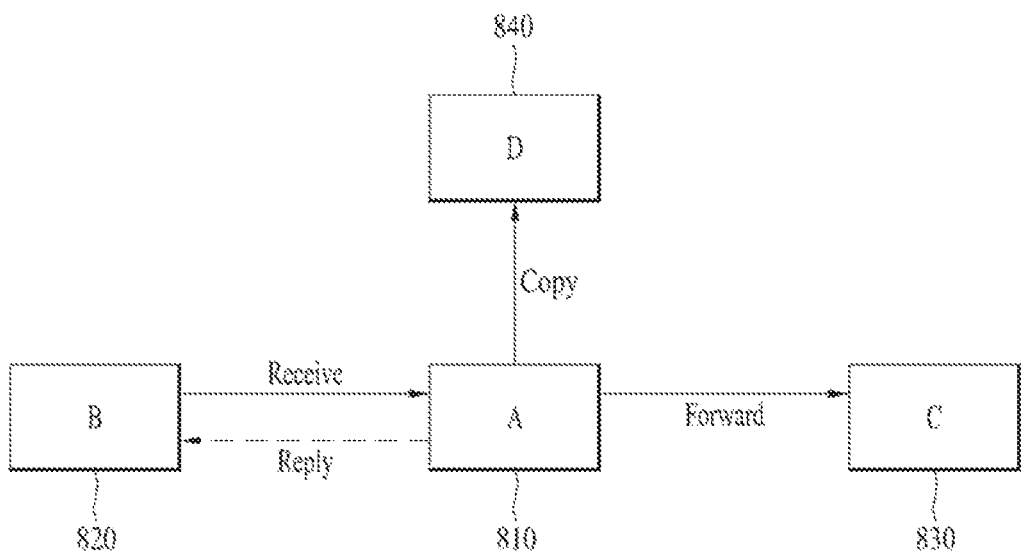
FIG. 8 is a diagram showing the concept of a smart copy, a smart forwarding and a smart reply according to one embodiment of the present invention.

FIG. 8 is a diagram showing the concept of a smart copy, a smart forwarding and a smart reply according to one embodiment of the present invention.

Referring to FIG. 8, A 810 means a user, B 820 means a sender sending a message to the user, and C 820 means a specific recipient 830 receiving a message received and forwarded by the user A 810. D 840 means a multitude of unspecific recipients receiving a message received or stored and forwarded by the user A 810.

According to smart copy, the user A 810 forwards a message received by the user A to a multitude of unspecific recipients D 840. A basic text message is generated based on an originally received message. After the basic text message has been saved to the memory 520, a second text is generated to be appropriate for a situation based on the basic message saved to the memory 520.

According to smart forwarding, the user A 810 forwards a message received by the user A to the specific recipient C 830. A basic text message is generated based on an originally received message. After the basic text message has been saved to the memory 520, a second text is generated to be appropriate for a position, relationship and usual way of speaking with the specific recipient C based on the basic message saved to the memory 520.

According to smart reply, the user A 810 forwards a response message to a message received by the user A to the specific sender B 820. A simple original response message is generated and then saved to the memory 520. Subsequently, a third text is generated to be appropriate for a position, relationship and usual way of speaking with the specific sender B based on the response message saved to the memory 520.

Figure 9:
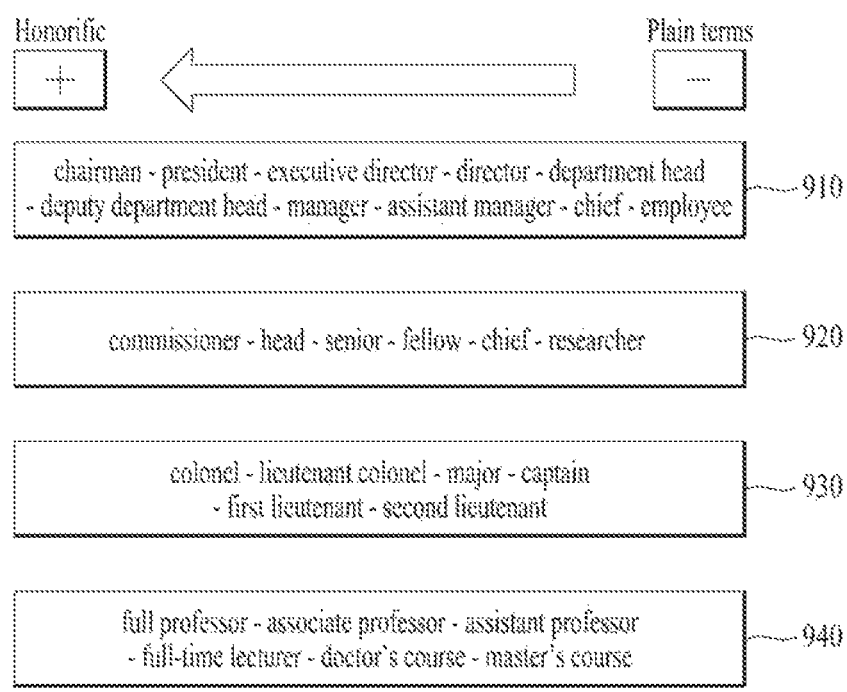
FIG. 9 is a diagram showing one example of setting a priority differently depending on a position according to one embodiment of the present invention.

FIG. 9 is a diagram showing one example of setting a priority differently depending on a position according to one embodiment of the present invention.

The controller 530 determines a priority based on at least one of a position information in the received recipient information and a text message content corresponding to a recipient.

If the position information in the recipient information is not clear, the controller 530 analyzes the text message content corresponding to the recipient and then determines a priority based on a result of the analysis.

Namely, the controller 530 analyzes the text message content corresponding to the recipient saved to the memory 520. If the saved text message is written in honorific, the controller 530 generates a text using honorific by determining that a priority is higher than a reference value.

The controller 530 analyzes the text message content corresponding to the recipient saved to the memory 520. If the saved text message is written in plain terms, the controller 530 generates a text using plain terms by determining that a priority is lower than the reference value.

If the position information in the recipient information is not clear and there is no text message corresponding to the recipient, the controller 530 generates a text using honorific.

As shown in FIG. 9, if a priority is higher than a reference value, the controller 530 generates a text using honorific. If a priority is lower than the reference value, the controller 530 generates a text using plain terms. Here, the reference value means a position information of the user.

Like a box 910, in case of administrative position or office job, the priority is determined in order of chairman, president, executive director, director, department head, deputy department head, manager, assistant manager, chief, and employee.

Like a box 920, in case of research job, the priority is determined in order of commissioner, head, senior, fellow, chief, and researcher.

Like a box 930, in case of ordinary soldier, the priority is determined in order of sergeant major, master sergeant, sergeant first class, staff sergeant, sergeant, corporal, private first class, and private. In case of officers, the priority is determined in order of colonel, lieutenant colonel, major, captain, first lieutenant, and second lieutenant.

Like a box 940, in case of teaching profession, the priority is determined in order of full professor, associate professor, assistant professor, full-time lecturer, doctor's course, and master's course.

According to one embodiment of the present invention, there is a third priority meaning a priority different from position. Here, the third priority means intimacy of relationship.

Plain terms are used on familiar acquaintanceship despite the same position. In this case, the third priority is low.

Honorific is used on unfamiliar acquaintanceship. In this case, the third priority is high.

The controller 530 determines the third priority based on at least one of a call count, a call time, a call time slot, a text count, a mobile messenger access count, a mobile messenger tag count, and a count linked to a photo stored in a memory.

For instance, if a call count, a call time, a call time band, a text count, a mobile messenger access count, a mobile messenger tag count, and a count linked to a photo stored in a memory include 3 or more per week, 5 minutes or more, a time slot after 9 P.M., 3 or more per week, 3 or more per week, 3 or more per week, and 3 or more per month, respectively, the controller 530 obtains intimate relationship with a user and then determines the third priority as low.

For instance, if a call count, a call time, a call time band, a text count, a mobile messenger access count, a mobile messenger tag count, and a count linked to a photo stored in a memory include 2 or less per week, 1 minute or less, a time slot before 9 P.M., 2 or less per week, 2 or less per week, 2 or less per week, and 2 or less per month, respectively, the controller 530 obtains unintimate relationship with a user and then determines the third priority as high.

Figure 10:
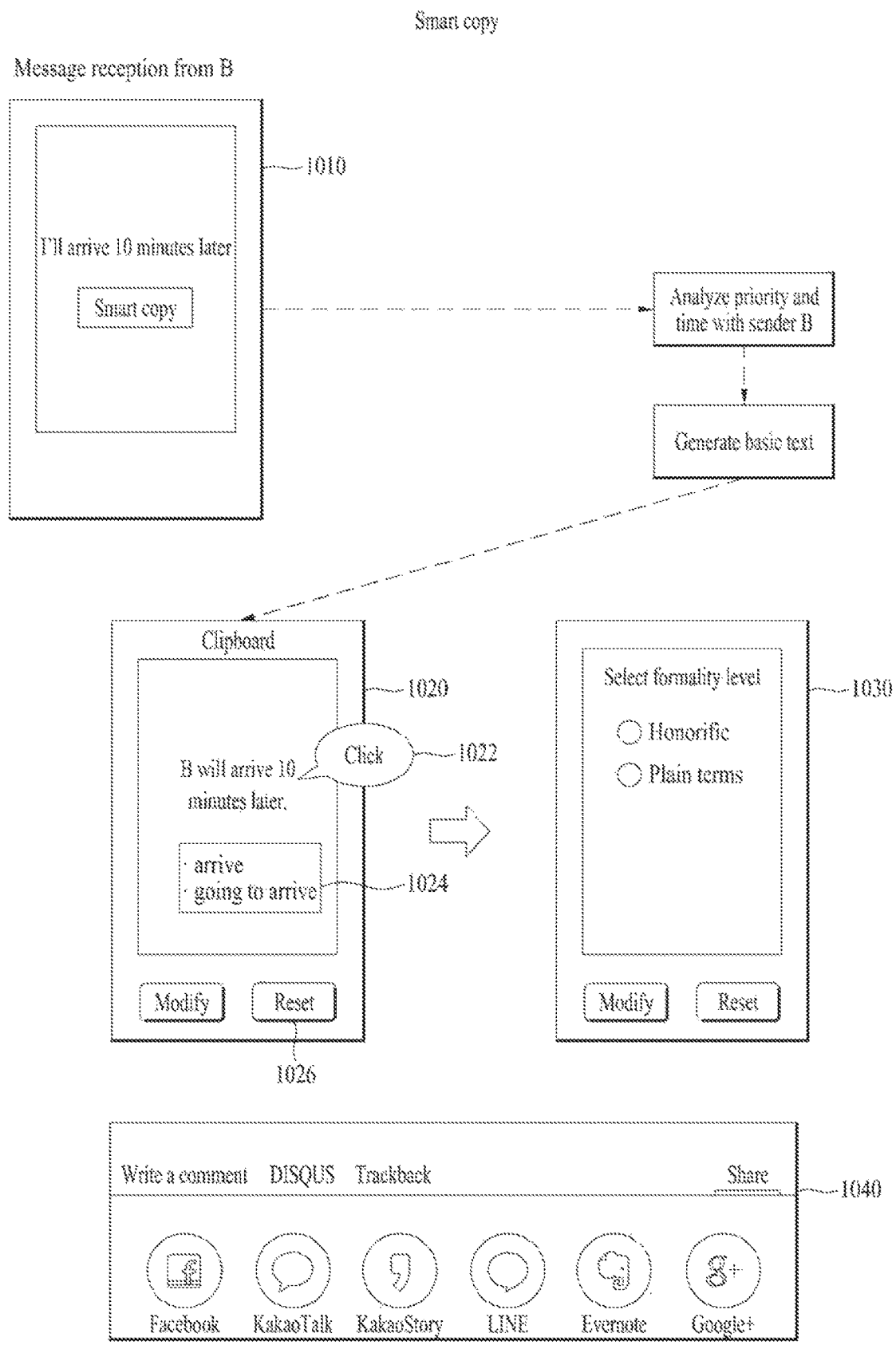
FIG. 10 is a diagram showing an example of a smart copy according to one embodiment of the present invention.

FIG. 10 is a diagram showing an example of a smart copy according to one embodiment of the present invention.

Like a mobile screen 1010, if receiving a specific text 'I'll arrive 10 minutes later' from a sender B, the controller 530 analyzes a priority and time with the sender B and then generates a basic text based on the analysis result.

Like a mobile screen 1020, the generated basic text includes substance of 'B will arrive 10 minutes later'. The controller 530 can modify a subject, a verb, an object and a time part in a sentence of the basic text.

The controller 530 compares 'I'll arrive 10 minutes later' of the mobile screen 1010 displaying the received message with 'B will arrive 10 minutes later' of the mobile screen 1020 displaying the message to be sent and then execute at least one of highlight, underline and mark in different color on a modified part.

If receiving a touch input over a prescribed time to the modified part from a user, the controller 1024 displays a message box 1024 including alternatives on the screen.

For example, if receiving a touch input to a part 'will arrive', the controller 530 displays a message box 1024 including the alternatives 'arrive' and 'going to arrive' on the screen. If receiving a specific touch input corresponding to a specific sentence such as 'arrive' from the user, the controller 530 modifies 'will arrive' into a specific sentence such as 'arrive'.

If receiving a touch input over a prescribed time to a rest button 1026 from the user, the controller 530 displays a message box 1030 for changing a priority such as formality level.

For example, if receiving a touch input for selecting honorific from the user, the controller 530 changes a whole sentence into a formality level corresponding to honorific. If receiving a touch input for selecting plain terms from the user, the controller 530 changes a whole sentence into a formality level corresponding to plain terms.

If receiving a touch input over a prescribed time to a specific part such as an icon indicating share in the mobile device from a user, the controller 530 displays a share screen 1040.

If receiving a touch input over a prescribed time to a specific icon such as Facebook, KakaoTalk, Line, email or the like displayed on the share screen 1040 from the user, the controller 530 shares the modified text with other social network and email services.

FIG. 11 is a diagram showing that a second text is generated by reflecting time information according to one embodiment of the present invention.

A first text further includes time information and the controller 530 generates a second text by reflecting time information. Time information may include: a) absolute time; and b) relative time. Here, the absolute time means that time information does not change according to a time flow. And, the relative time information means that time information changes according to a time flow.

a) If time information is absolute time, the controller 530 generates the second text without changing time information.

For example, like a mobile screen 1110, if a first text includes 'I'll arrive at 10 o'clock', time information is 10 o'clock corresponding to absolute time.

Like a mobile screen 1120, using the time information intact without changing the time information, the controller 530 generates a second text including the substance 'B will arrive at 10 o'clock'.

b) If time information is relative time, the controller 530 changes time information in consideration of an elapse time from a timing of receiving the first text to a current timing and then generates a second text by reflecting the changed time information.

For example, like a mobile screen 1130, if the first text includes 'I'll arrive 10 minutes later', time information is 10 minutes corresponding to relative time.

The controller 530 changes time information in consideration of an elapse time '5 minutes' from a timing of receiving the first text to a current time and then generates a second text including the substance 'B will arrive 5 minutes later' by reflecting the changed time information.

Figure 12:
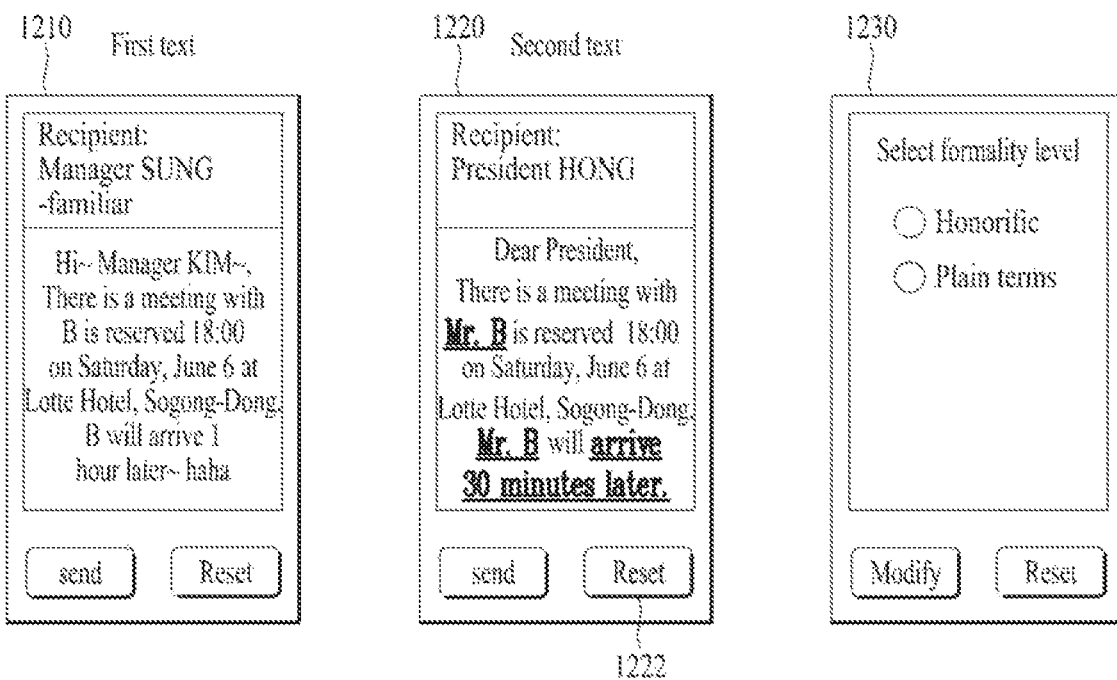
FIG. 12 is a diagram showing that a changed word is displayed in a manner of being displayed differently in case of forwarding according to one embodiment of the present invention.

FIG. 12 is a diagram showing that a changed word is displayed in a manner of being displayed differently in case of forwarding according to one embodiment of the present invention.

The controller 530 compares a first text with a generated second text, displays a changed part differently from an existing part of the first text based on the comparison result, and displays the second text on a screen by reflecting the displayed changed part.

If receiving a touch input over a prescribed time to a changed part from a user, the controller 530 displays a message box for modifying the changed part.

For example, like a mobile screen 1210, a user 'manager KIM' receives a first text from a recipient 'manager SUNG'. Here, B, manager SUNG and manager KIM are very familiar with each other by frequently contacting with each other. Manager KIM and president HONG are not familiar with each other and have the clear business relationship between subordinates and superiors.

The first text includes the following substance.

Hi~ Manager KIM~, a meeting with B is reserved 18:00 on Saturday, June 6 at Lotte Hotel, Sogong-Dong. B will arrive 1 hour later~○ ○

Like a mobile screen 120, the second text includes the following substance.

Dear President, a meeting with Mr. B is reserved 18:00 on Saturday, June 6 at Lotte Hotel, Sogong-Dong. Mr. B will arrive 30 minutes later.

The controller 530 compares the first text with the generated second text and then displays a changed part differently from an existing part of the first text based on the comparison result.

Like a mobile screen 1220, the changed parts correspond to 'Mr. B', '30 minutes' and 'later' and the controller 530 displays the changed parts differently from a basic part of the first text.

Particularly, the controller 530 applies at least one of highlight, underline, different thickness, and different color to the changed parts. By reflecting the displayed changed parts, the controller 530 displays the second text on the screen.

If receiving a touch input over a prescribed time to the changed part from the user, the controller 530 displays a message box for modifying the changed part.

Moreover, if receiving a touch input over a prescribed time to a specific region of the mobile device such as a rest icon 1222 from the user, the controller 530 displays a message box 1230 for changing a priority like 'select formality level' on the screen.

Figure 13:
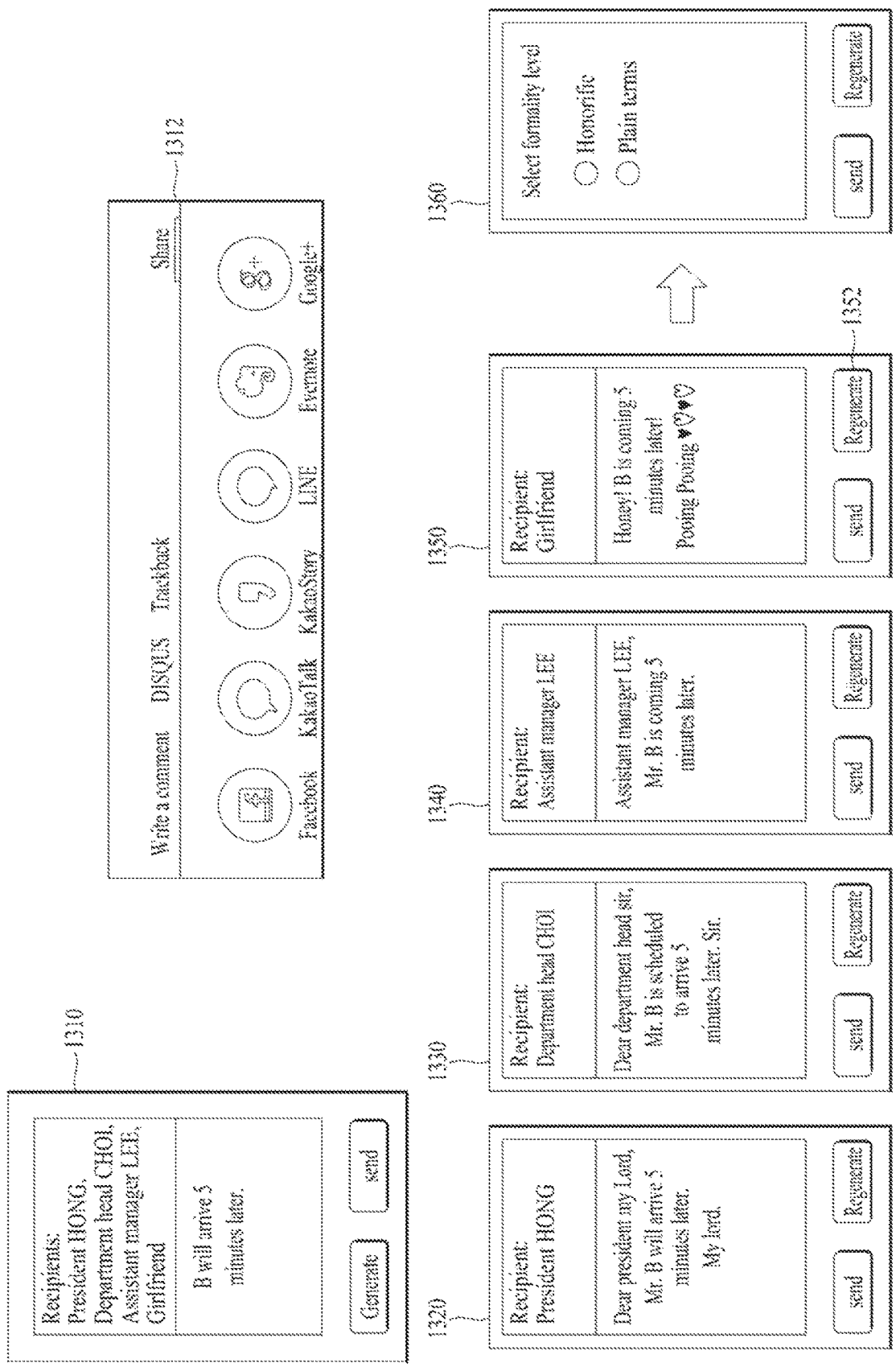
FIG. 13 is a diagram showing that a second text is generated differently per recipient in forwarding according to one embodiment of the present invention.

FIG. 13 is a diagram showing that a second text is generated differently per recipient in forwarding according to one embodiment of the present invention.

The controller 530 generates a second text per recipient information based on a determined priority and a first text.

For example, like a mobile screen 1310, recipients include president HONG, department head CHOI, assistant manager LEE, and girlfriend. The first text includes the substance 'B will arrive 5 minutes later'.

If a priority is a first priority, the controller 530 generates a second text by changing at least one of subject, object and verb of the first text into honorific. Here, the first priority means that a priority is higher than a user. And, a second priority means that a priority is lower than the user.

A user is manager KIM, President HONG and department head CHOI having positions higher than that of the user. Assistant manager LEE has a position lower than that of the user.

When the recipient is president HONG, since the president HONG is the person corresponding to the highest position in the company and has a priority higher than the user, the controller 530 sets the priority to be high.

Like a mobile screen 1320, the controller 530 generates a second text, which includes the substance 'Dear president, Mr. B will arrive 5 minutes later', by changing subject, object and verb into honorific.

When the recipient is the department head CHOI, since the department head CHOI has a position below president in company and has a priority higher than the user but lower than president HONG, the controller 530 sets the priority to be lower than president HONG but higher than the user by considering such priorities.

Like a mobile screen 1330, the controller 530 generates a second text including the substance 'Dear department head, Mr. B is scheduled to arrive 5 minutes later' by changing subject, object and verb into honorific all.

When the recipient is assistant manager LEE, since the manager LEE has a position lower than the user in the company, the controller 530 sets a priority to be lower than the user.

In particular, if the priority is a second priority, the controller 530 generates a second text by changing at least one of subject, object and verb of the second text into plain terms.

Like a mobile screen 1340, the controller 530 generates a second text including the substance 'Assistant manager LEE, Mr. B is coming 5 minutes later' by changing subject, object and verb into plain terms appropriately.

When the recipient is a girlfriend, since the girlfriend is not restricted by a position in the company or the like, the controller 530 generates a second text based on an existing message pattern by excluding the priority.

Like a mobile screen 1350, the controller 530 generates a second text including the substance 'Honey! B is coming 5 minutes later! Pooing Pooing ♥♡♥♡' and specific emoticons by appropriately changing subject, object and verb based on an existing message pattern.

In determining whether the recipient is a girlfriend, the controller 530 makes determination with a name save d to the memory. For example, if a specific recipient is saved as a name (e.g., sweetheart, my love, my princess, honey, etc.), the controller determines the recipient as the girlfriend.

Subsequently, the controller 530 determines whether the recipient is a girlfriend based on at least one of a call count, a call time, a call time slot, a text count, a mobile messenger access count, a mobile messenger tag count, and a count linked to a photo stored in a memory.

For instance, if a call count, a call time, a call time band, a text count, a mobile messenger access count, a mobile messenger tag count, and a count linked to a photo stored in a memory include 3 or more per week, 10 minutes or more, a time slot after 9 P.M., 3 or more per day, 3 or more per week, 3 or more per week, and 3 or more per month, respectively, the controller 530 determines the lover relationship with a user.

If receiving a touch input over a prescribed time to a specific part such as a regenerate icon 1352 of the mobile device from a user through the interface module 510, the controller 530 displays a message box 1360 for changing a priority.

If receiving a touch input over a prescribed time to a specific part such as an icon indicating 'share' in the mobile device from the user, the controller 530 displays a share screen 1312.

If receiving a touch input over a prescribed time to a specific icon such as Facebook, KakaoTalk, Line, email or the like displayed on the share screen 1312 from the user, the controller 530 shares a modified text with other social network and email services.

Figure 14:
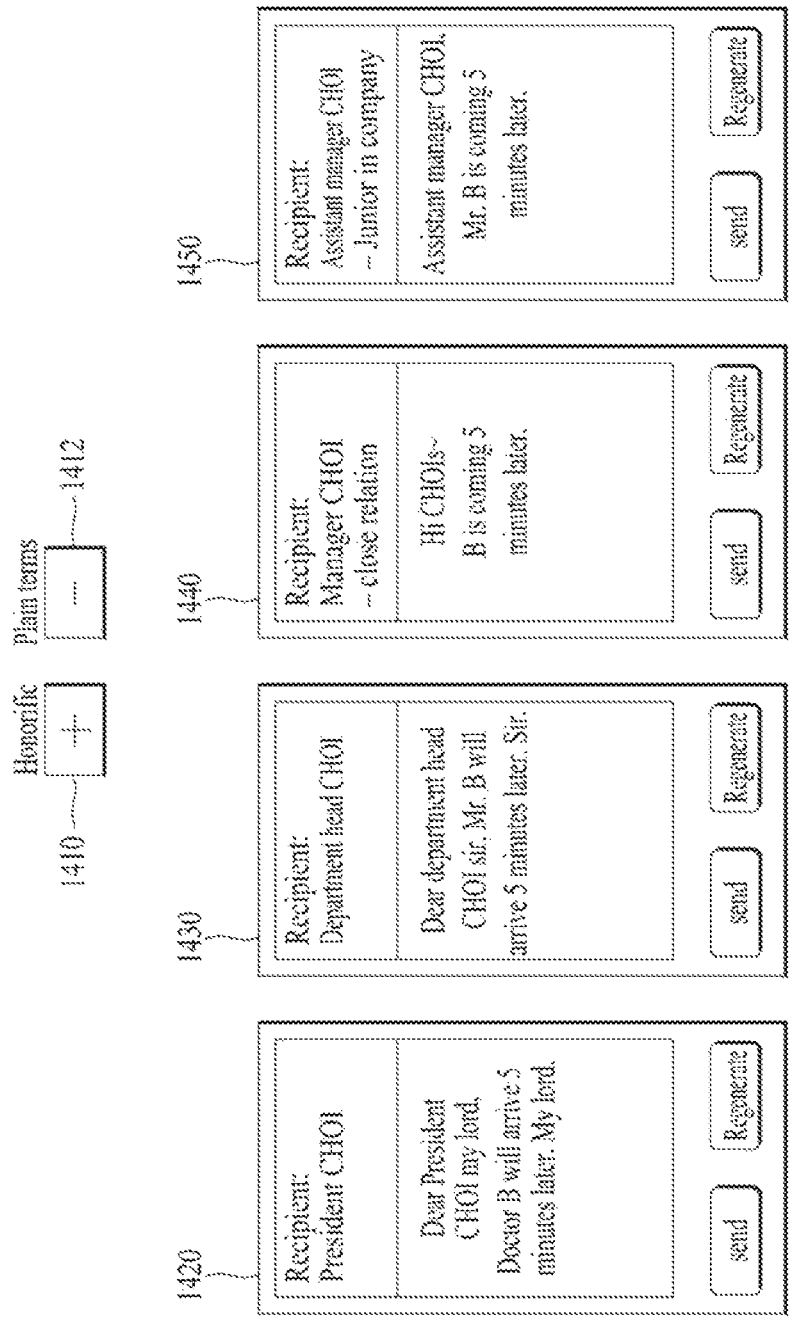
FIG. 14 is a diagram showing a process for adjusting a priority in forwarding and generating a second text differently depending on the priority according to one embodiment of the present invention.

FIG. 14 is a diagram showing a process for adjusting a priority in forwarding and generating a second text differently depending on the priority according to one embodiment of the present invention.

When a plus icon 1410 and a minus icon 1412 are located at a specific part of the mobile device, if a touch input of touching the plus icon 1410 is received from a user, the controller 530 generates a second text by raising a priority.

If a touch input of touching the minus icon 1412 is received from a user, the controller 530 generates a second text by lowering a priority.

Here, the plus icon 1410 and the minus icon 1412 may correspond to a plus button and a minus button of a mobile device volume button.

For example, when a currently generated second text includes 'Dear department head CHOI, Mr. B will arrive 5 minutes later' like a mobile screen 1430, if an input of touching the plus icon 1410 is received from a user, as displayed on a mobile screen 1420, the controller 530 generates a second text by raising a priority like 'Dear President CHOI, Doctor B will arrive 5 minutes later'.

If receiving an input of touching the minus icon 1412 from the user, the controller 530 generates a second text by lowering a priority like a mobile screen 1430.

For example, when a currently generated second text includes 'Dear department head CHOI, Mr. B will arrive 5 minutes later' like a mobile screen 1430, if an input of touching the minus icon 1412 is received from the user, the controller 530 generates a second text by lowering the priority like 'Assistant manager CHOI, Mr. B is coming 5 minutes later' like a mobile screen 1450.

If receiving an input of simultaneously touching the plus icon 1410 and the minus icon 1412 from the user, the controller 530 generates a second text like a mobile screen 1440 in consideration of a message pattern previously stored in the memory 520 irrespective of a priority.

For example, when a currently generated second text includes 'Dear department head CHOI, Mr. B will arrive 5 minutes later' like the mobile screen 1430, if an input of simultaneously touching the plus icon 1410 and the minus icon 1412 is received from the user, the controller 530 generates a second text 'Hi CHOIs~ B is coming 5 minutes later' like the mobile screen 1440 irrespective of a priority.

Figure 15:
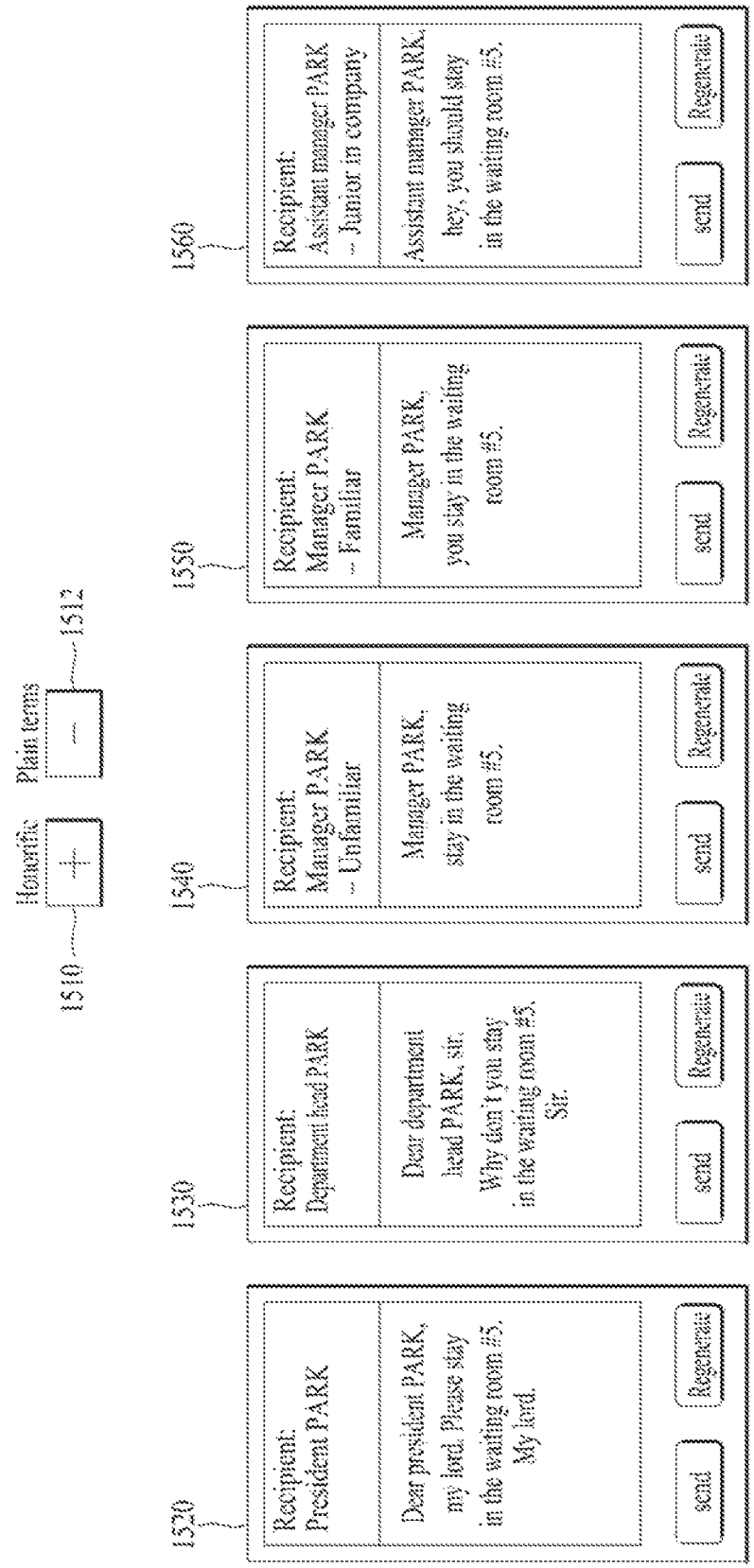
FIG. 15 is a diagram showing a process for adjusting a priority in forwarding and generating a second text differently depending on the priority according to one embodiment of the present invention.

FIG. 15 is a diagram showing a process for adjusting a priority in forwarding and generating a second text differently depending on the priority according to one embodiment of the present invention.

When a plus icon 1510 and a minus icon 1512 are located at a specific part of the mobile device, if a touch input of touching the plus icon 1510 is received from a user, the controller 530 generates a second text by raising a priority.

If a touch input of touching the minus icon 1512 is received from a user, the controller 530 generates a second text by lowering a priority.

Here, the plus icon 1510 and the minus icon 1512 may correspond to a plus button and a minus button of a mobile device volume button.

For example, when a currently generated second text includes 'Manager PARK, stay in the waiting room #5' like a mobile screen 1540, if an input of touching the plus icon 1510 once is received from the user, the controller 530 generates a second text such as 'Dear department head PARK, why don't you stay in the waiting room #5' by raising a priority like a mobile screen 1530.

When a currently generated second text includes 'Manager PARK, stay in the waiting room #5' like the mobile screen 1540, if an input of touching the plus icon 1510 twice is received from the user, the controller 530 generates a second text such as 'Dear president PARK, please stay in the waiting room #5' by raising a priority by one step like a mobile screen 1520.

If an input of touching the minus icon 1512 is received from a user, the controller 530 generates a second text by lowering a priority like a mobile screen 1550.

For example, when a currently generated second text includes 'Manager PARK, stay in the waiting room #5' like the mobile screen 1540, if an input of touching the minus icon 1520 is received from the user, the controller 530 generates a second text such as 'Manager PARK, you stay in the waiting room #5' by lowering a priority like the mobile screen 1550.

When a currently generated second text includes 'Manager PARK, stay in the waiting room #5' like the mobile screen 1540, if an input of touching the minus icon 1520 twice is received from the user, the controller 530 generates a second text such as 'Assistant manager PARK, you should stay in the waiting room #5' by lowering a priority by one step like a mobile screen 1560.

Here, the manager PARK of the mobile screen 1540 has the same position of the user but is not familiar with the user. Yet, the manager PARK of the mobile screen 1550 has the same position of the user, is familiar with the user, and has the intimate relationship.

According to the present invention, a second text having a priority changed using a plus/minus icon can be easily generated, whereby user convenience is improved.

Figure 16:
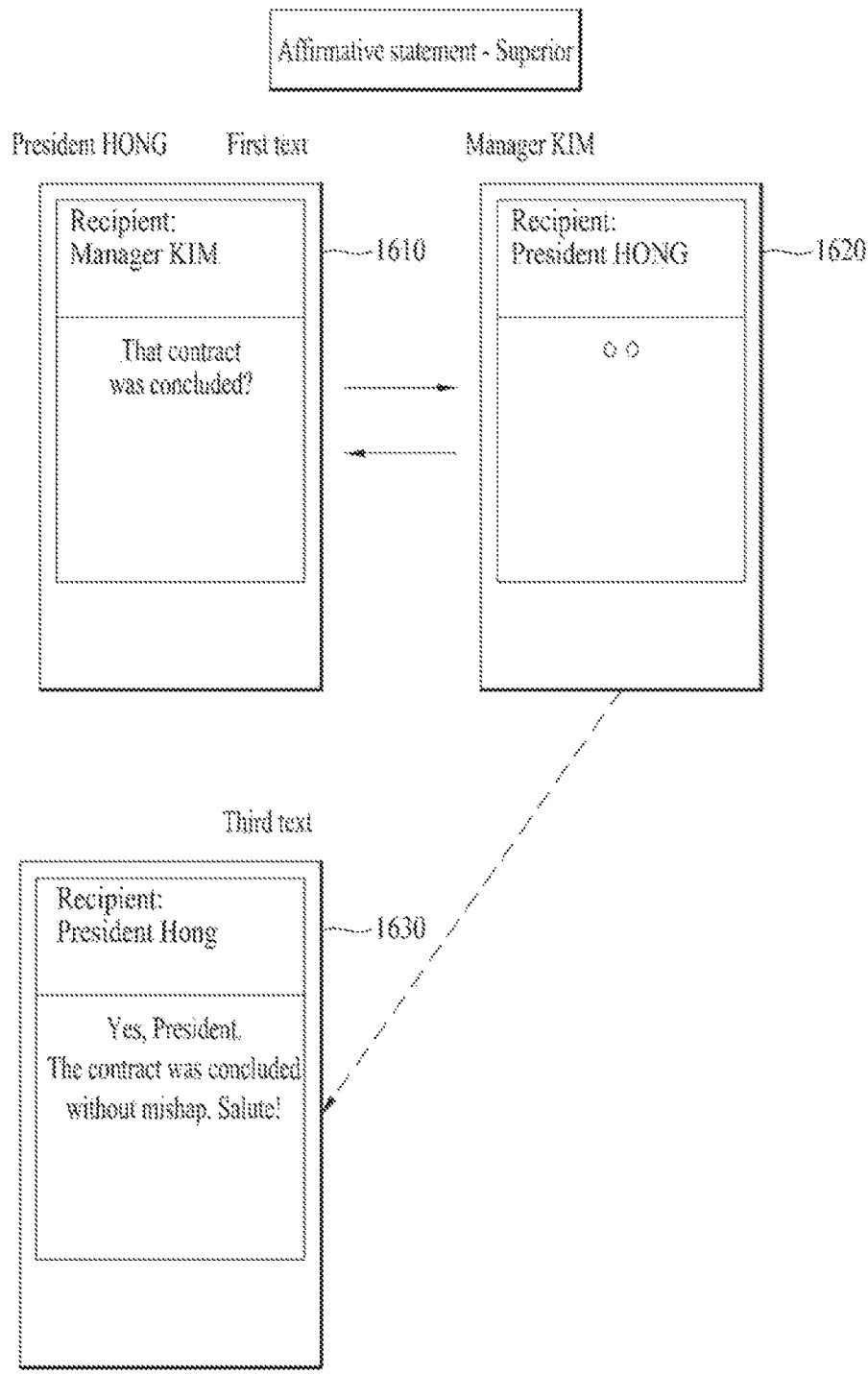
FIG. 16 is a diagram showing that when a smart reply is launched, a third text to be forwarded to a superior is generated based on a specific input meaning affirmation according to one embodiment of the present invention.

FIG. 16 is a diagram showing that when a smart reply is launched, a third text to be forwarded to a superior is generated based on a specific input meaning affirmation according to one embodiment of the present invention. Here, a user is the manager KIM.

The controller 530 obtains sender information corresponding to a first external device from the memory 520, determines a priority with a user based on the obtained sender information, receives a specific input corresponding to the received first text from the user, generates a third text based on the determined priority and the received specific input, and sends the generated third text to the first external device.

For example, after receiving a first text 1610 such as 'That contract was concluded?' from President HOMG, a user may not be able to make a reply under several circumstances despite that the user has to make a quick reply to a superior. In this situation, the user may send the superior a polite reply with courtesy using a short, simple and specific input 1620 such as '◯ ◯' that means affirmation.

The controller 530 obtains sender information such as President HONG, which corresponds to the first external device, from the memory 520 and then determines a priority with the user based on the obtained sender information. Here, since the sender is a superior of the user, the priority is set higher than a reference value.

The controller 530 receives the specific input '◯ ◯' corresponding to the first text 1610 such as 'That contract was concluded?' from the user, generates a third text 1630 such as 'Yes, President. The contract was concluded without mishap. Salute!' based on the determined priority and the received specific input, and then sends the generated third text to the first external device.

Here, when the third text is generated, the controller 530 analyzes a usual message pattern sent to the sender by the user and then generates the third text based on the analysis result.

According to the present invention, in a situation that a long reply message should be sent to a counterpart who should be treated with courtesy, as a message having courtesy can be sent using a simple specific input only, user convenience is improved.

Figure 17:
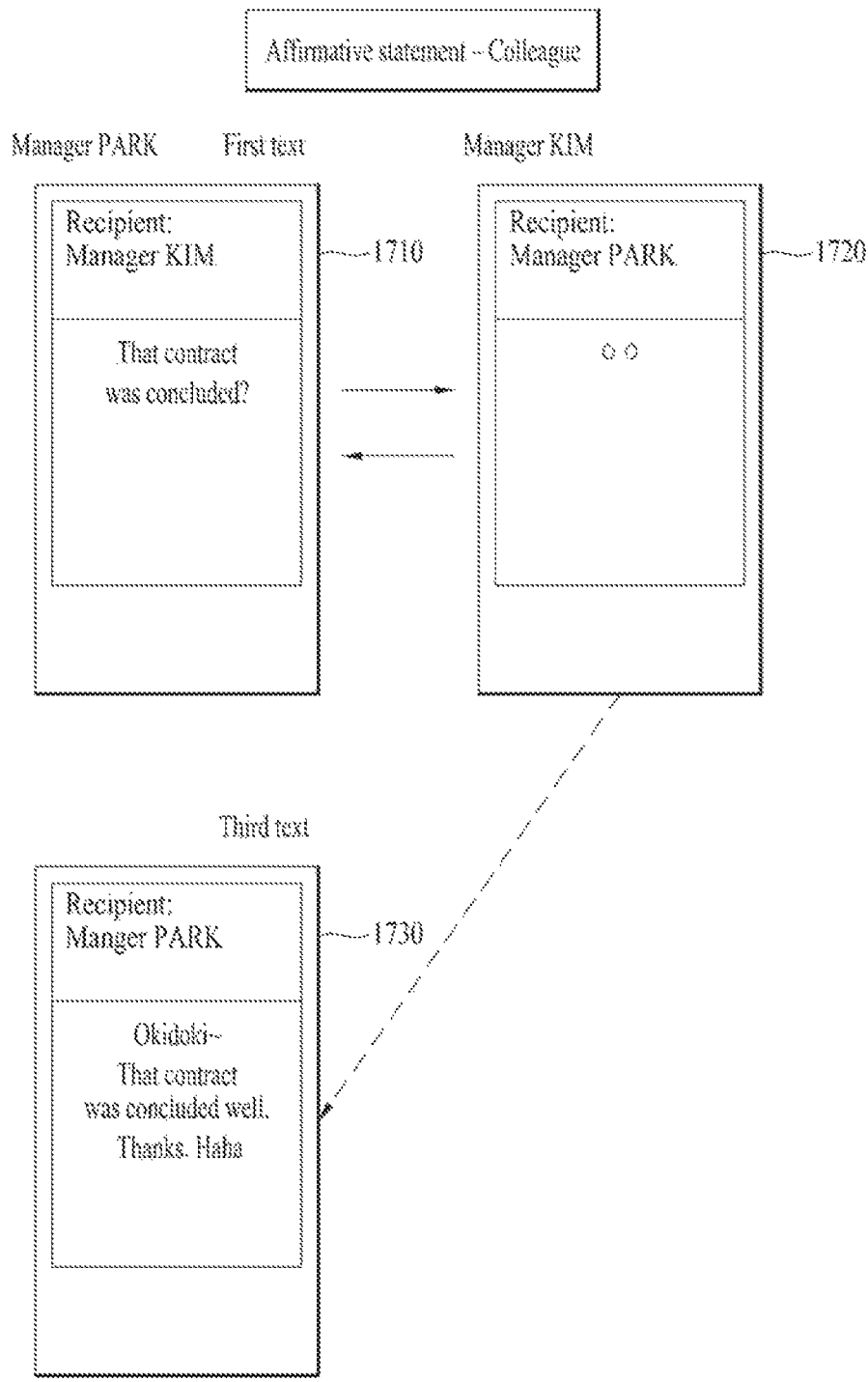
FIG. 17 is a diagram showing that when a smart reply is launched, a third text to be forwarded to a colleague is generated based on a specific input meaning affirmation according to one embodiment of the present invention.

FIG. 17 is a diagram showing that when a smart reply is launched, a third text to be forwarded to a colleague is generated based on a specific input meaning affirmation according to one embodiment of the present invention.

For example, if receiving a first text 1710 such as 'That contract was concluded well?' from a fellow worker, manager PARK, a user may not be able to make a reply under several circumstances despite that the user has to make a quick reply to the colleague. In this situation, the user may send the colleague an appropriate replay with the usual way of talking using a short, simple and specific input such as '◯ ◯' 1720 that means affirmation.

The controller 530 obtains sender information such as Manager PARK, which corresponds to the first external device, from the memory 520 and then determines a priority with the user based on the obtained sender information. Here, since the sender is a colleague of the user, the priority is set to the same value as a reference value.

The controller 530 receives the specific input 1720 such as '◯ ◯' corresponding to the first text 1710 such as 'That contract was concluded?' from the user, generates a third text 1730 such as 'Okidoki~ That contract was concluded well. Thanks. ㅎㅎ' based on the determined priority and the received specific input, and then sends the generated third text 1730 to the first external device.

Figure 18:
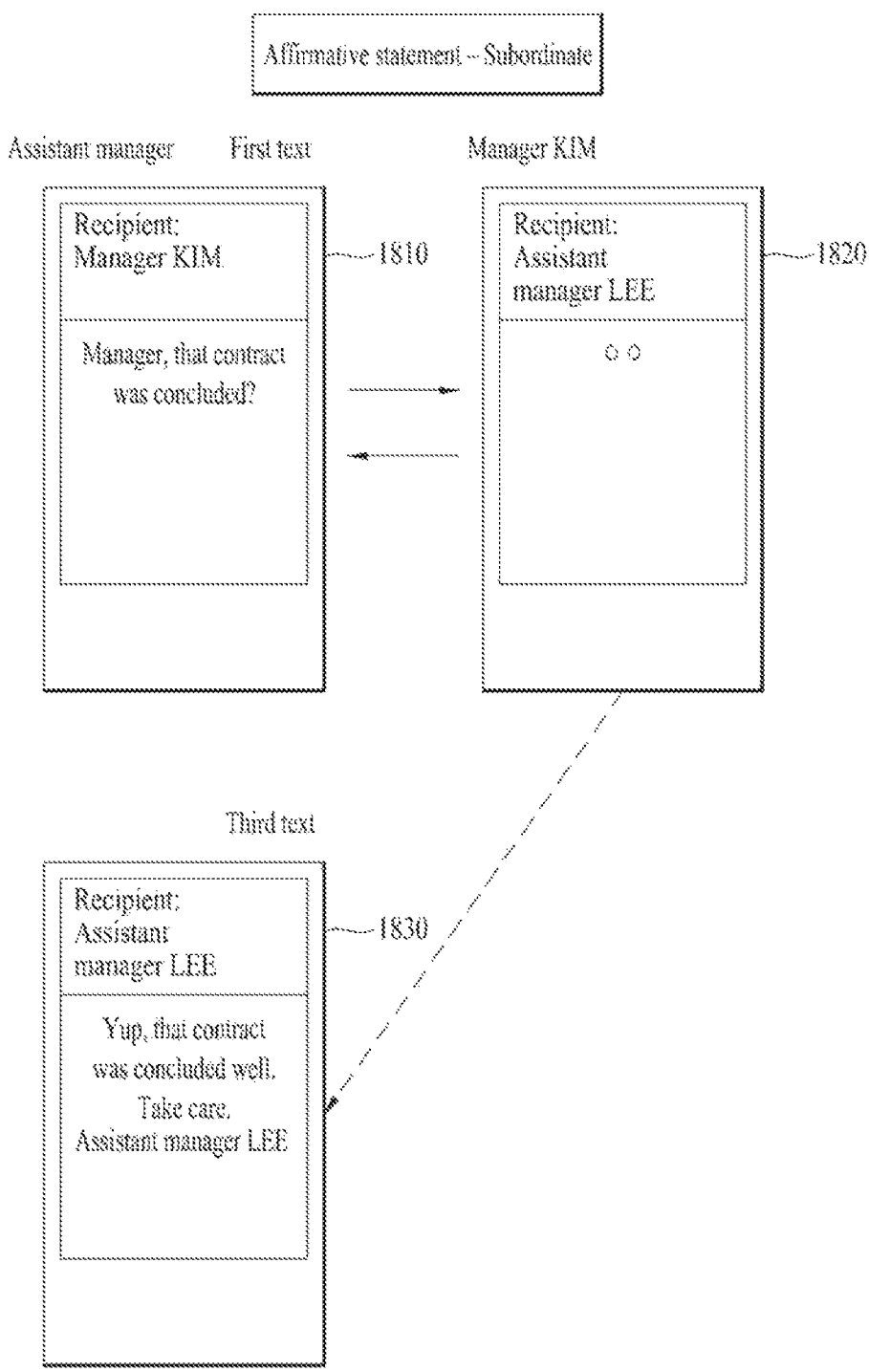
FIG. 18 is a diagram showing that when a smart reply is launched, a third text to be forwarded to a subordinate is generated based on a specific input meaning affirmation according to one embodiment of the present invention.

FIG. 18 is a diagram showing that when a smart reply is launched, a third text to be forwarded to a subordinate is generated based on a specific input meaning affirmation according to one embodiment of the present invention.

For example, if receiving a first text 1810 such as 'Manager, that contract was concluded?' from a subordinate employee, assistant manager LEE, a user may not be able to make a reply under several circumstances despite that the user has to make a quick reply to the subordinate employee. In this situation, the user may send the subordinate an appropriate replay with the usual way of talking using a short, simple and specific input 1820 such as 'ㅇ ㅇ' that means affirmation.

The controller 530 obtains sender information such as assistant manager LEE, which corresponds to the first external device, from the memory 520 and then determines a priority with the user based on the obtained sender information. Here, since the sender is a user's subordinate employee, the priority is set to a value lower than a reference value.

The controller 530 receives the specific input 1820 such as 'ㅇ ㅇ' corresponding to the first text 1810 such as 'Manager, that contract was concluded?' from the user, generates a third text 1830 such as 'Yup, that contract was concluded well. Take care. Assistant manager LEE ~' based on the determined priority and the received specific input 1820, and then sends the generated third text to the first external device.

Figure 19:
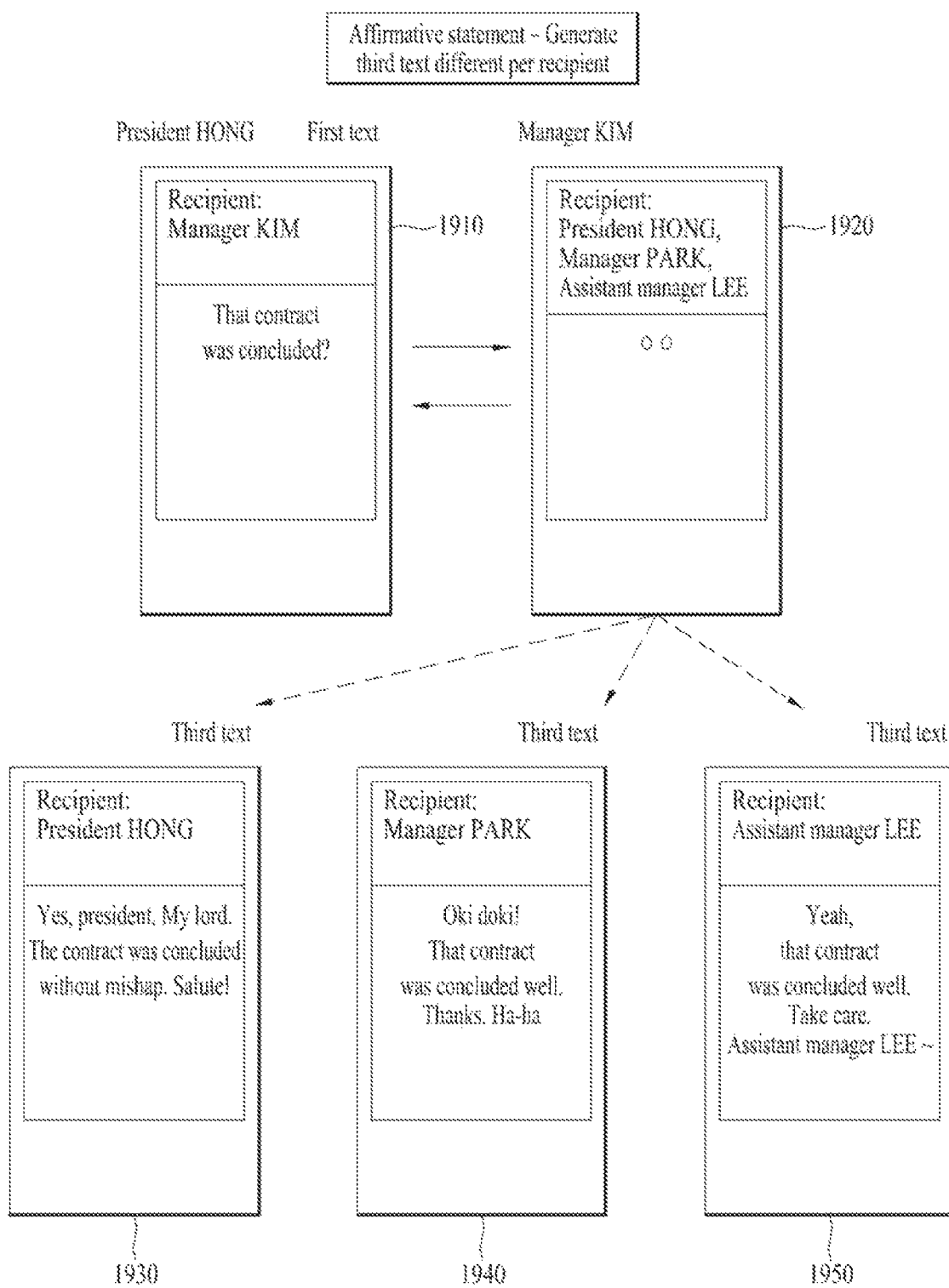
FIG. 19 is a diagram showing that when a smart reply is launched, a third text to be forwarded differently per recipient is generated based on a specific input meaning affirmation according to one embodiment of the present invention.

FIG. 19 is a diagram showing that when a smart reply is launched, a third text to be forwarded differently per recipient is generated based on a specific input meaning affirmation according to one embodiment of the present invention.

For example, if receiving a first text 1910 such as 'Manager, that contract was concluded?' from a boss, President HONG, a user may not be able to make a reply under several circumstances despite that the user has to make a quick reply to a superior, colleague and subordinate employee. In this situation, the user may send the superior, colleague and subordinate employee an appropriate replay with the usual way of talking using a short, simple and specific input such as 'ㅇ ㅇ' that means affirmation.

The controller 530 obtains sender information such as president HONG, which corresponds to the first external device, from the memory 520 and then determines a priority with the user based on the obtained sender information. Here, since the sender is a user's superior, the priority is set to a value higher than a reference value.

The controller 530 obtains recipient information from the memory 520, and determines a priority with the user based on the obtained recipient information. Here, if the recipient is the colleague, the priority is determined as the same value of the reference value. If the recipient is the subordinate employee, the priority is determined as a value lower than the reference value.

The controller 530 receives the specific input 1920 such as 'ㅇ ㅇ' corresponding to the first text from the user, generates a third text different per recipient based on the determined priority and the received specific input 1920, and then sends the generated third text to the first external device.

For example, if the recipient is the boss, president HONG, the third text 1930, which includes 'Yes, president. The contract was concluded without mishap. Salute!', is generated.

If the recipient is the colleague, manager PARK, the third text 1940, which includes 'Okidoki~ that contract was concluded well. Thanks. ㅎㅎ', is generated.

If the recipient is the subordinate employee, assistant manager LEE, the third text 1950, which includes 'Yup, that contract was concluded well. Take care. Assistant manager LEE ~', is generated.

Figure 20:
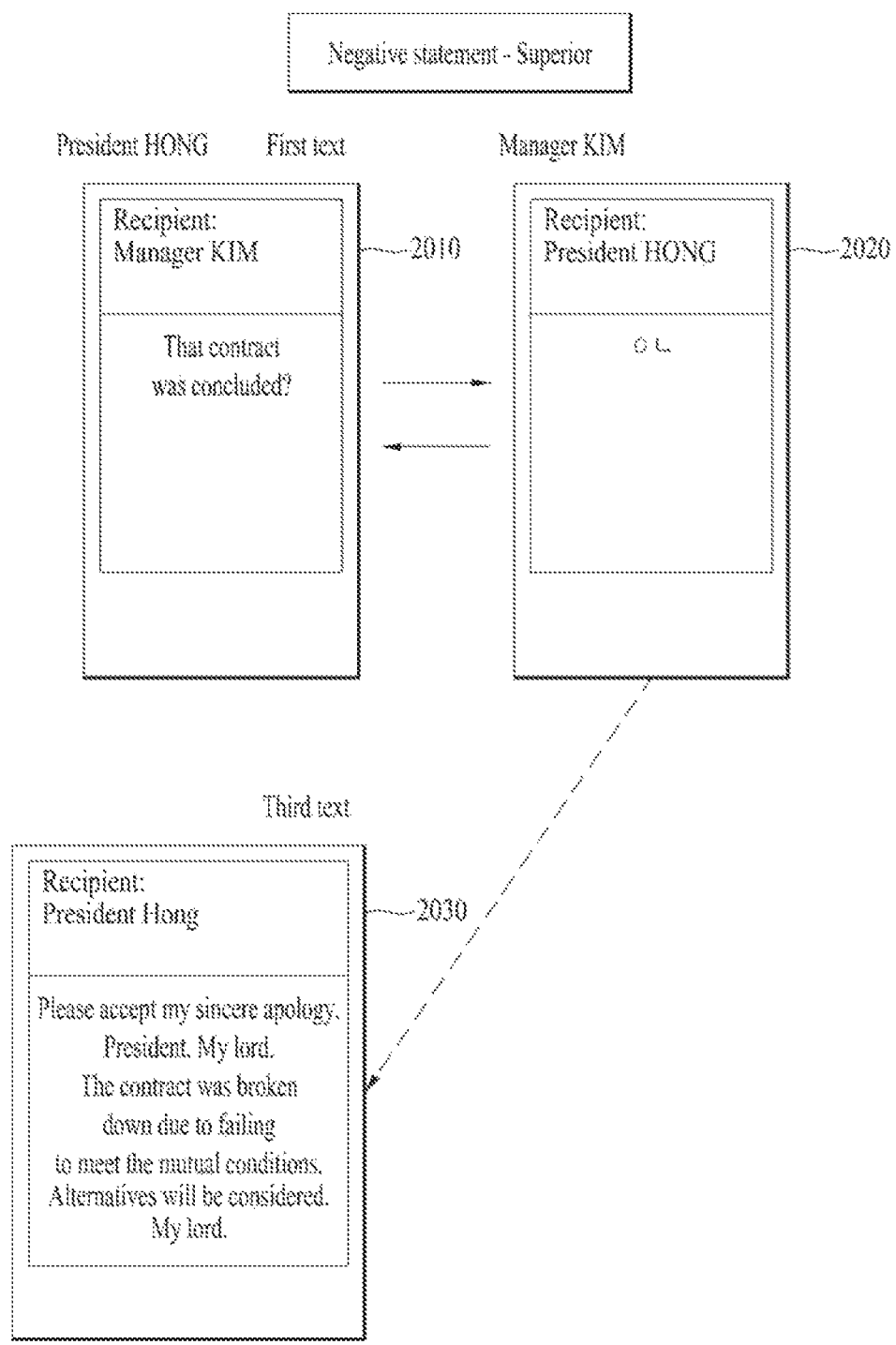
FIG. 20 is a diagram showing that when a smart reply is launched, a third text to be forwarded to a superior is generated based on a specific input meaning negation according to one embodiment of the present invention.

FIG. 20 is a diagram showing that when a smart reply is launched, a third text to be forwarded to a superior is generated based on a specific input meaning negation according to one embodiment of the present invention.

For example, if receiving a first text 2010 such as 'That contract was concluded?' from President HOMG, a user may not be able to make a reply under several circumstances despite that the user has to make a quick reply to a superior. In this situation, the user may send the superior a polite reply with courtesy using a short, simple and specific input 2020 such as 'ㅇㄴ' that means negation.

The controller 530 obtains sender information such as President HONG, which corresponds to the first external device, from the memory 520 and then determines a priority with the user based on the obtained sender information. Here, since the sender is a superior of the user, the priority is determined as higher than a reference value.

The controller 530 receives the specific input 2020 such as 'ㅇㄴ' corresponding to the first text 2010 such as 'That contract was concluded?' from the user, generates a third text 2030 such as 'So sorry. President. The contract was broken down due to failing to meet the mutual conditions. Alternatives will be considered.' based on the determined priority and the received specific input, and then sends the generated third text 2030 to the first external device.

Here, when the third text is generated, the controller 530 analyzes a usual message pattern sent to the sender by the user and then generates the third text based on the analysis result.

According to the present invention, in a situation that a long reply message should be sent to a counterpart who should be treated with courtesy, as a message having courtesy can be sent using a simple specific input only, user convenience is improved.

Figure 21:
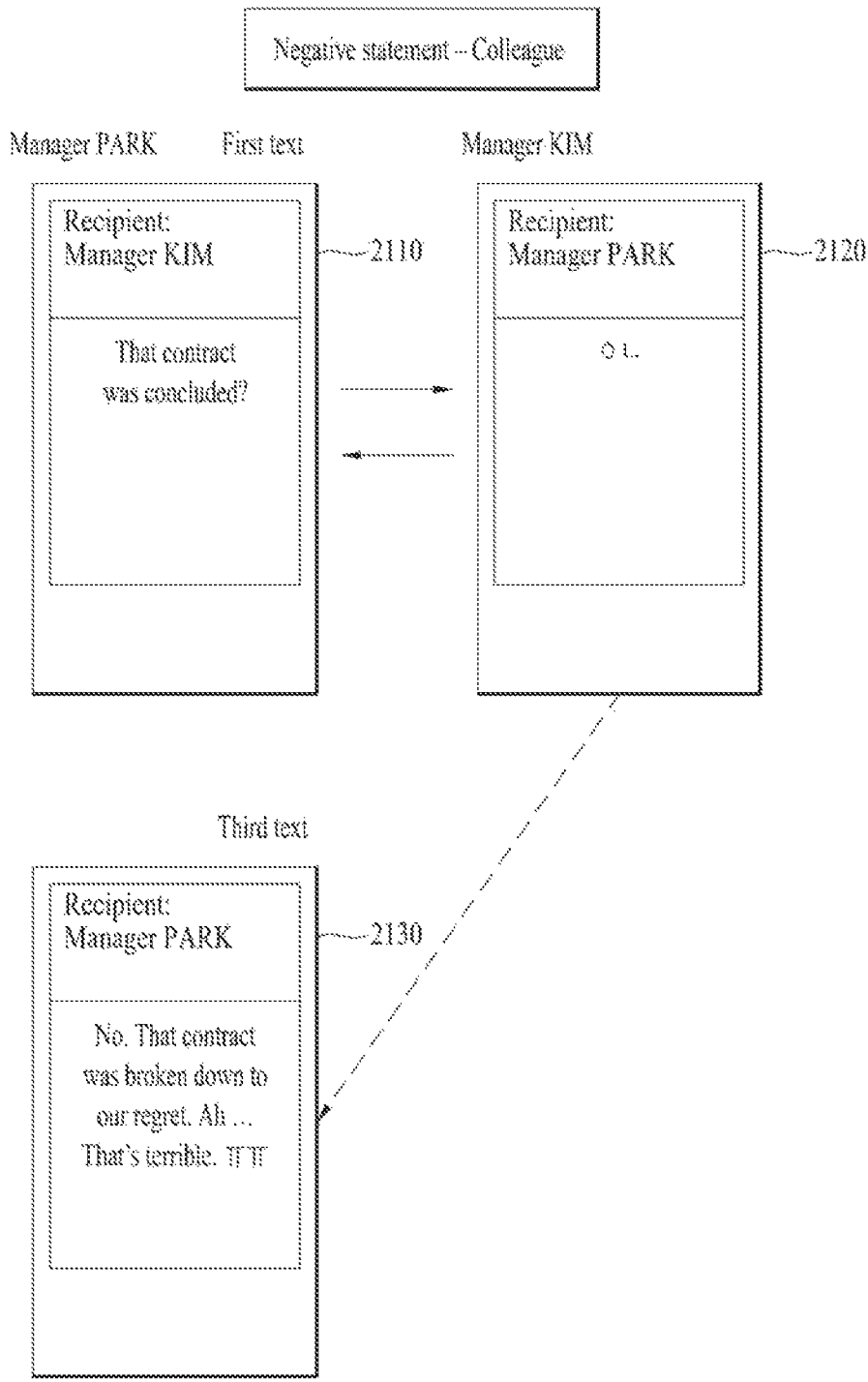
FIG. 21 is a diagram showing that when a smart reply is launched, a third text to be forwarded to a colleague is generated based on a specific input meaning negation according to one embodiment of the present invention.

FIG. 21 is a diagram showing that when a smart reply is launched, a third text to be forwarded to a colleague is generated based on a specific input meaning negation according to one embodiment of the present invention.

For example, if receiving a first text 2110 such as 'That contract was concluded well?' from a fellow worker, manager PARK, a user may not be able to make a reply under several circumstances despite that the user has to make a quick reply to the colleague. In this situation, the user may send the colleague an appropriate replay with the usual way of talking using a short, simple and specific input such as 'ㅇㄴ' 2120 that means negation.

The controller 530 obtains sender information such as Manager PARK, which corresponds to the first external device, from the memory 520 and then determines a priority with the user based on the obtained sender information. Here, since the sender is a colleague of the user, the priority is set to the same value as a reference value.

The controller 530 receives the specific input 2120 such as 'ㅇ ㅇ' corresponding to the first text 2110 such as 'That contract was concluded?' from the user, generates a third text 2130 such as 'No. That contract was broken down to our regret. Ah That's terrible. ㅠㅠ' based on the determined priority and the received specific input, and then sends the generated third text 2130 to the first external device.

Figure 22:
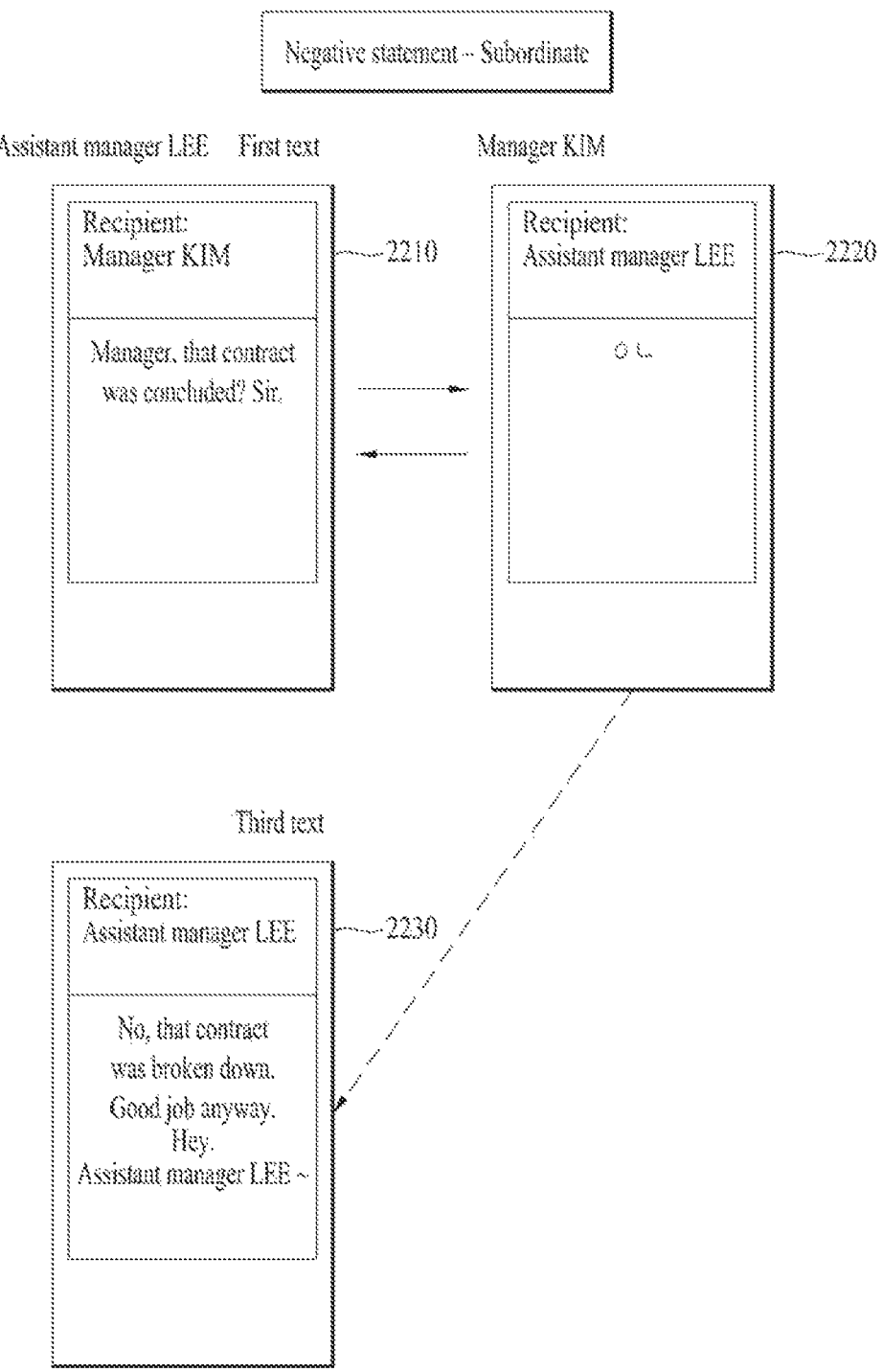
FIG. 22 is a diagram showing that when a smart reply is launched, a third text to be forwarded to a subordinate is generated based on a specific input meaning negation according to one embodiment of the present invention.

FIG. 22 is a diagram showing that when a smart reply is launched, a third text to be forwarded to a subordinate is generated based on a specific input meaning negation according to one embodiment of the present invention.

For example, if receiving a first text 2210 such as 'Manager, that contract was concluded?' from a subordinate employee, assistant manager LEE, a user may not be able to make a reply under several circumstances despite that the user has to make a quick reply to the subordinate employee. In this situation, the user may send the subordinate an appropriate replay with the usual way of talking using a short, simple and specific input 2220 such as 'ㅇㄴ' that means negation.

The controller 530 obtains sender information such as assistant manager LEE, which corresponds to the first external device, from the memory 520 and then determines a priority with the user based on the obtained sender information. Here, since the sender is a user's subordinate employee, the priority is set to a value lower than a reference value.

The controller 530 receives the specific input 2220 such as 'ㅇㄴ' corresponding to the first text 2210 such as 'Manager, that contract was concluded?' from the user, generates a third text 2230 such as 'Yup, that contract was concluded well. Take care. Assistant manager LEE ~' based on the determined priority and the received specific input 2220, and then sends the generated third text 2230 to the first external device.

Figure 23:
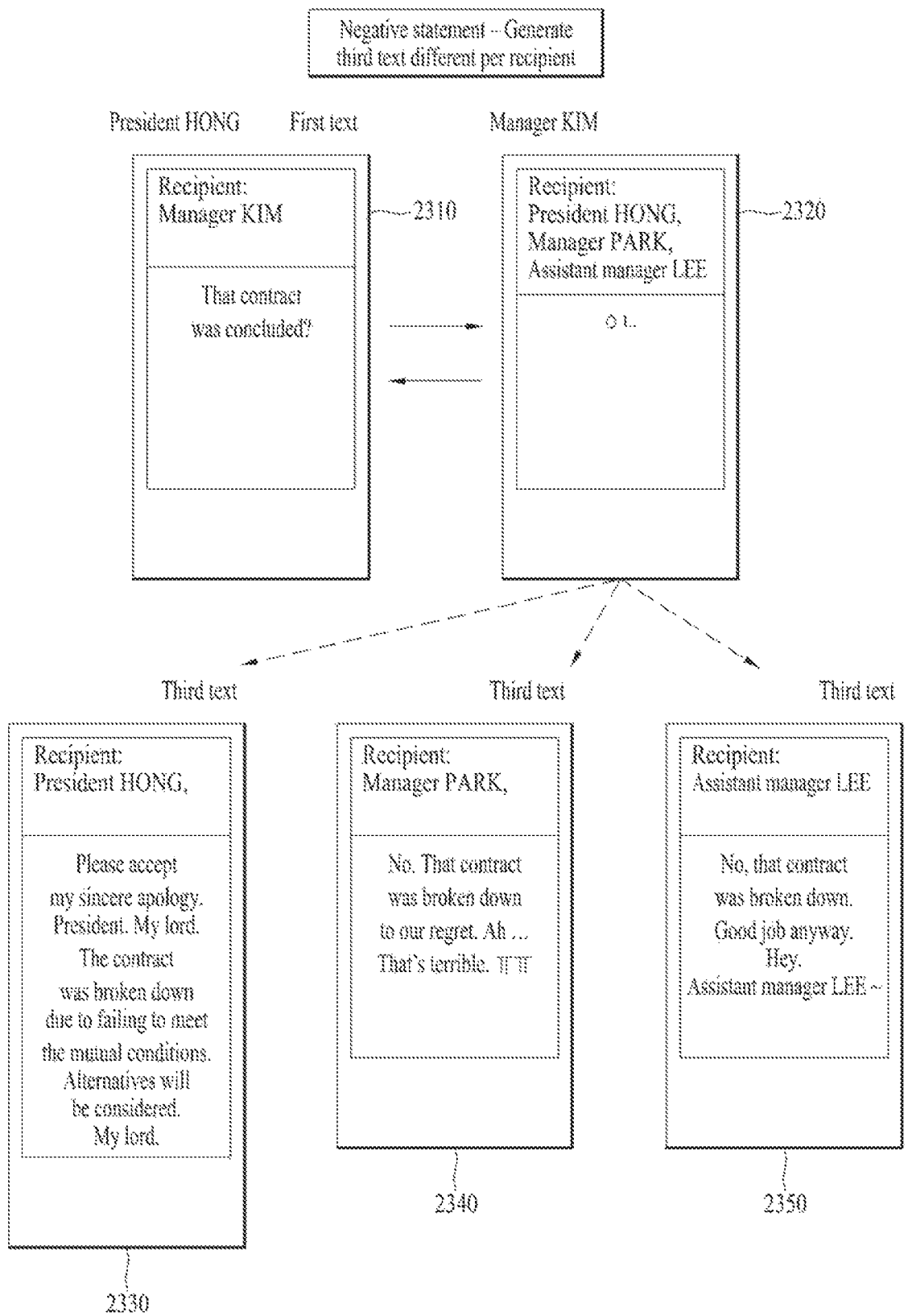
FIG. 23 is a diagram showing that when a smart reply is launched, a third text to be forwarded differently per recipient is generated based on a specific input meaning negation according to one embodiment of the present invention.

FIG. 23 is a diagram showing that when a smart reply is launched, a third text to be forwarded differently per recipient is generated based on a specific input meaning negation according to one embodiment of the present invention.

For example, if receiving a first text 2310 such as 'That contract was concluded?' from a boss, President HONG, a user may not be able to make a reply under several circumstances despite that the user has to make a quick reply to a superior, colleague and subordinate employee. In this situation, the user may send the superior, colleague and subordinate employee an appropriate replay with the usual way of talking using a short, simple and specific input such as 'ㅇㄴ' that means negation.

The controller 530 obtains sender information such as president HONG, which corresponds to the first external device, from the memory 520 and then determines a priority with the user based on the obtained sender information. Here, since the sender is a user's superior, the priority is set to a value higher than a reference value.

The controller 530 obtains recipient information from the memory 520, and determines a priority with the user based on the obtained recipient information. Here, if the recipient is the colleague, the priority is determined as the same value of the reference value. If the recipient is the subordinate employee, the priority is determined as a value lower than the reference value.

The controller 530 receives the specific input 2320 such as 'ㅇㄴ' corresponding to the first text from the user, generates a third text different per recipient based on the determined priority and the received specific input 2320, and then sends the generated third text to the first external device.

For example, if the recipient is the boss, president HONG, the third text 2330, which includes 'So sorry. President. The contract was broken down due to failing to meet the mutual conditions. Alternatives will be considered.', is generated.

If the recipient is the colleague, manager PARK, the third text 2340, which includes 'No. That contract was broken down to our regret. Ah . . . That's terrible. ㅠㅠ', is generated.

If the recipient is the subordinate employee, assistant manager LEE, the third text 2350, which includes 'No, that contract was broken down. Good job anyway. Assistant manager LEE ~', is generated.

According to one embodiment of the present invention, when a user forwards a received message to a third party, a different text is generated in a manner of changing a word appropriately in consideration of priorities including positions between the user and the third party and usual conversation patterns, whereby user convenience is improved.

According to another embodiment of the present invention, when a user forwards a received message to a plurality of recipients, a different text is generated per recipient in a manner of changing a word appropriately in consideration of priorities including positions between the user and a plurality of the recipients and usual conversation patterns, whereby user convenience is improved.

According to further embodiment of the present invention, when a user forwards a received message to a third party, a text displaying a modified part differently from an original text is generated so as to enable the user to recognize the modified part intuitively and modify it easily, whereby user convenience is improved.

According to another further embodiment of the present invention, when a user forwards a response message to a received message to a sender, if a simple specific input is received from the user, a text including appropriate sentences are generated in consideration of priorities including positions between the user and the sender and usual conversation patterns, whereby user convenience is improved.

While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents. And, it is apparently understandable that an embodiment is configured by combining claims failing to have relation of explicit citation in the appended claims together or can be included as new claims by amendment after filing an application.

MODE FOR INVENTION

Various embodiments are disclosed in BEST MODE FOR INVENTION for implementing the present invention.

INDUSTRIAL APPLICABILITY

The present invention is used for a series of mobile device fields.

It will be appreciated by those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A method of controlling a mobile device, the method comprising:

receiving a first text from a memory or a first external device;
obtaining at least one recipient information associated with a recipient from the memory;
determining a priority based on rank information of the recipient at a company included in the obtained at least one recipient information;
generating a second text based on the determined priority and the received first text;
displaying the generated second text on a screen; and
sending the displayed second text to a second external device different from the first external device corresponding to the at least one recipient information,
wherein the generating the second text comprises:
comparing a rank of the recipient with a rank of a user of the mobile device at the company;
generating the second text by changing at least one of a subject, an object, or a verb of the first text into honorific when the rank of the recipient is higher than the rank of the user; and
generating the second text by changing at least one of the subject, object, or verb of the first text into a plain term when the rank of the recipient is lower than the rank of the user.

2. The method of claim 1, wherein the first text comprises time information, and wherein the generating the second text further comprises generating the second text by reflecting the time information.

3. The method of claim 2, wherein the generating the second text further comprises:
if the time information is absolute time, generating the second text without changing the time information; and
if the time information is relative time, generating the second text in a manner of changing the time information in consideration of an elapse time from a timing of receiving the first text to a current timing and reflecting the changed time information.

4. The method of claim 1, further comprising, after the displaying the second text on the screen, if receiving a touch input over a prescribed time to a specific part of the mobile device from the user, displaying a message box for changing the priority.

5. The method of claim 1, wherein the displaying the second text on the screen comprises:
comparing the first text with the generated second text;
displaying a changed part differently from a corresponding part of the first text based on a comparison result; and
displaying the second text on the screen by reflecting the displayed changed part.

6. The method of claim 5, further comprising if receiving a touch input over a prescribed time to the changed part from the user, displaying a message box for modifying the changed part.

7. The method of claim 1, further comprising:
obtaining sender information corresponding to the first external device from the memory;
determining the priority with the user based on the obtained sender information;
receiving a specific input corresponding to the received first text from the user;
generating a third text based on the determined priority and the received specific input; and
sending the generated third text to the first external device.

8. A mobile device, comprising:
a communication module configured to transceive data with a first external device and a second external device;
a memory configured to store at least one recipient information associated with a recipient;
a display; and
a controller configured to:
receive a first text through the communication module from the memory or the first external device;
obtain recipient information from the memory;
determine a priority based on rank information of the recipient at a company included in the obtained recipient information;
generate a second text based on the determined priority and the received first text;
cause the display to display the generated second text on a screen; and
send the displayed second text to the second external device different from the first external device corresponding to the recipient information,
wherein the generating the second text comprises:
comparing a rank of the recipient with a rank of a user of the mobile device at the company;
generating the second text by changing at least one of a subject, an object, or a verb of the first text into honorific when the rank of the recipient is higher than the rank of the user; and
generating the second text by changing at least one of the subject, object, or verb of the first text into a plain term when the rank of the recipient is lower than the rank of the user.

9. The mobile device of claim 8, wherein the first text comprises time information, and wherein the controller generates the second text by reflecting the time information.

10. The mobile device of claim 9, wherein if the time information is absolute time, the controller generates the second text without changing the time information and
wherein if the time information is relative time, the controller generates the second text in a manner of changing the time information in consideration of an elapse time from a timing of receiving the first text to a current timing and reflecting the changed time information.

11. The mobile device of claim 8, further comprising an interface module receiving a touch input from the user, wherein if receiving a touch input over a prescribed time to a specific part of the mobile device from the user through the interface module, the controller is further configured to cause the display to display a message box for changing the priority.

12. The mobile device of claim 8, wherein the controller is further configured to:
compare the first text with the generated second text;
cause the display to display a changed part differently from a corresponding part of the first text based on a comparison result; and
cause the display to display the second text on the screen by reflecting the displayed changed part.

13. The mobile device of claim 12, wherein if receiving a touch input over a prescribed time to the changed part from the user, the controller is further configured to cause the display to display a message box for modifying the changed part.

14. The mobile device of claim 8, wherein the controller is further configured to:

obtain sender information corresponding to the first external device from the memory;

determine the priority with the user based on the obtained sender information;

receive a specific input corresponding to the received first text from the user;

generate a third text based on the determined priority and the received specific input; and cause the communication module to send the generated third text to the first external device.

15. The method of claim 1, wherein when there are plurality of recipients such that the second text is sent to a plurality of external devices, each of the plurality of external devices corresponding to a respective one of the plurality recipients, the second text is generated differently for each of the plurality of recipients based on respectively corresponding recipient information associated with a respectively corresponding one of the plurality of recipients.

16. The method of claim 15, wherein:

the plurality of recipients comprise a second recipient and a third recipient in addition to the recipient;

the second recipient has a rank that is higher than the rank of the user;

the third recipient has a rank that is lower than the rank of the user; and a priority of the second recipient is higher than a priority of the third recipient.

17. The method of claim 16, wherein:

the second text is generated by changing at least two of the subject, object, or verb of the first text into honorific for the second recipient; and the second text is generated by changing at least two of the subject, object, or verb of the first text into plain terms for the third recipient.

18. The mobile device of claim 8, wherein when there are plurality of recipients such that the second text is sent to a plurality of external devices, each of the plurality of external devices corresponding to a respective one of the plurality recipients, the second text is generated differently for each of the plurality of recipients based on respectively corresponding recipient information associated with a respectively corresponding one of the plurality of recipients.

19. The mobile device of claim 18, wherein:

the plurality of recipients comprise a second recipient and a third recipient in addition to the recipient;

the second recipient has a rank that is higher than the rank of the user;

the third recipient has a rank that is lower than the rank of the user; and a priority of the second recipient is higher than a priority of the third recipient.

20. The mobile device of claim 19, wherein:

the second text is generated by changing at least two of the subject, object, or verb of the first text into honorific for the second recipient; and the second text is generated by changing at least two of the subject, object, or verb of the first text into plain terms for the third recipient.

* * * * *